US009609494B2

(12) United States Patent
Kurokawa et al.

(10) Patent No.: US 9,609,494 B2
(45) Date of Patent: Mar. 28, 2017

(54) COMMUNICATION SYSTEM AND APPARATUS FOR PROVIDING SUPPLEMENTARY SERVICE IN FEMTO CELL

(71) Applicants: Osamu Kurokawa, Tokyo (JP); Kazuki Eguchi, Tokyo (JP); Naoki Yoshida, Tokyo (JP); Shunsuke Yokouchi, Tokyo (JP); Toru Shiiba, Tokyo (JP); Tomiharu Hamaguchi, Tokyo (JP); Yasuyuki Ueda, Tokyo (JP); Yasuhiro Watanabe, Tokyo (JP); Hiroaki Akiyama, Tokyo (JP); Takayuki Kido, Tokyo (JP)

(72) Inventors: Osamu Kurokawa, Tokyo (JP); Kazuki Eguchi, Tokyo (JP); Naoki Yoshida, Tokyo (JP); Shunsuke Yokouchi, Tokyo (JP); Toru Shiiba, Tokyo (JP); Tomiharu Hamaguchi, Tokyo (JP); Yasuyuki Ueda, Tokyo (JP); Yasuhiro Watanabe, Tokyo (JP); Hiroaki Akiyama, Tokyo (JP); Takayuki Kido, Tokyo (JP)

(73) Assignee: NEC CORPORATION, Tokyo (JP)

( * ) Notice: Subject to any disclaimer, the term of this patent is extended or adjusted under 35 U.S.C. 154(b) by 70 days.

(21) Appl. No.: 14/671,370

(22) Filed: Mar. 27, 2015

(65) Prior Publication Data
US 2015/0201315 A1 Jul. 16, 2015

Related U.S. Application Data

(62) Division of application No. 13/377,730, filed as application No. PCT/JP2010/061138 on Jun. 30, 2010, now Pat. No. 9,019,988.

(30) Foreign Application Priority Data

Jul. 2, 2009 (JP) .................................. 2009-157836

(51) Int. Cl.
H04L 12/28 (2006.01)
H04W 4/16 (2009.01)
(Continued)

(52) U.S. Cl.
CPC ............. *H04W 4/16* (2013.01); *H04L 65/103* (2013.01); *H04L 65/1006* (2013.01);
(Continued)

(58) Field of Classification Search
CPC ..... H04W 4/16; H04W 80/10; H04W 84/045; H04W 88/184; H04L 65/1006; H04L 65/103
See application file for complete search history.

(56) References Cited

U.S. PATENT DOCUMENTS 5,949,775 A    9/1999 Rautiola et al.
2006/0258394 A1  11/2006 Dhillon et al.
(Continued)

FOREIGN PATENT DOCUMENTS

CN   101291297 A   10/2008
JP   09-135479 A   5/1997
(Continued)

OTHER PUBLICATIONS

Office Action dated Apr. 2, 2013 issued by the Japanese Patent Office in corresponding Japanese Patent Application No. 2009-157836.
(Continued)

Primary Examiner — Kan Yuen
(74) Attorney, Agent, or Firm — Sughrue Mion, PLLC

(57) ABSTRACT

When a femto cell base station used for a communication system provided with a function of providing a predeter-
(Continued)

mined supplementary service receives first information indicating supplementary service control from a radio terminal, the femto cell base station converts the received information to a SIP (Session Initiation Protocol) message including the first information and transmits the SIP message to a higher apparatus in the communication system.

5 Claims, 17 Drawing Sheets

(51) Int. Cl.
*H04M 7/12* (2006.01)
*H04L 29/06* (2006.01)
*H04W 80/10* (2009.01)
*H04W 84/04* (2009.01)
*H04W 88/18* (2009.01)

(52) U.S. Cl.
CPC ............ *H04M 7/126* (2013.01); *H04W 80/10* (2013.01); *H04W 84/045* (2013.01); *H04W 88/184* (2013.01)

(56) References Cited

U.S. PATENT DOCUMENTS

| | | | |
|---|---|---|---|
| 2007/0254681 A1* | 11/2007 | Horvath | ............... H04W 4/14 455/466 |
| 2007/0298817 A1 | 12/2007 | Alfano et al. | |
| 2008/0096553 A1 | 4/2008 | Saksena et al. | |
| 2008/0113679 A1* | 5/2008 | Sung | ............... H04L 12/5835 455/466 |
| 2008/0167035 A1 | 7/2008 | Buckley et al. | |
| 2008/0293382 A1 | 11/2008 | Lubenski et al. | |
| 2008/0299980 A1* | 12/2008 | Buckley | ............... H04W 28/06 455/445 |
| 2009/0003550 A1 | 1/2009 | Mani et al. | |

FOREIGN PATENT DOCUMENTS

| | | |
|---|---|---|
| JP | 2005-217959 A | 8/2005 |
| JP | 2007-311951 A | 11/2007 |
| JP | 2008-172794 A | 7/2008 |
| JP | 2008-541617 A | 11/2008 |
| JP | 2009-504051 A | 1/2009 |
| JP | 2010-507345 A | 3/2010 |
| WO | 2006/124291 A1 | 11/2006 |
| WO | 2007/015075 A1 | 2/2007 |
| WO | 2008/051716 A1 | 5/2008 |

OTHER PUBLICATIONS

Office Action dated Dec. 4, 2013, issued by the State Intellectual Property Office of the People's Republic of China in counterpart Chinese Application No. 201080029922.5.

* cited by examiner

Fig.3

|  | SS control |
|---|---|
| R-URI | sip:IP-SM-GW@operator.com |
| PPI header | sip-uri : IMSI@...<br>cpc=notification |
| Content-Type | application/vnd.3gpp.dtap |
| Body(format) | text |
| Body(content) | contain signals AFTER TI, from Protocol Discriminator.<br>TI (Transaction ID) from UE<br>→ Femto AP is restricted in Femto AP.<br>TI (Transaction ID) from CN<br>→ Femto AP will be any value (ie "0000"). |

Fig.4

| SS SERVICE MENU | | OTHER PARTY OF COMMUNICATION (HLR OR VLR) | Type | REMARKS |
|---|---|---|---|---|
| CF | CF SETTING/SETTING CANCELLATION (INCLUDING FTN SETTING/CALLING TIME SETTING) | UE→HSS/VLR→HLR | #3 | ·HLR → HSS/VLR IS UPDATED BY MAP-STANDALONE.ISD (WHEN CFU-ACTIVATE, FTN IS NOT NOTIFIED TO HSS/VLR) |
| | Interrogate (CFU) | UE→HSS/VLR→HLR | #4 | ·HLR IS INTERROGATED ON CFU |
| | Interrogate (CFB/CFNRc/CFNRy) | UE→HSS/VLR | #5 | ·HLR ACCESS IS UNNECESSARY |
| CW | CW SETTING/SETTING CANCELLATION | UE→HSS/VLR→HLR | #3 | ·HLR → HSS/VLR IS UPDATED BY MAP-STANDALONE.ISD |
| | Interrogate | UE→HSS/VLR | #5 | HLR ACCESS IS UNNECESSARY |
| CLIP | Interrogate | UE→HSS/VLR | #5 | ·HLR ACCESS IS UNNECESSARY |
| CLIR | Interrogate | UE→HSS/VLR | #5 | ·HLR ACCESS IS UNNECESSARY |
| CB | PASSWORD REGISTRATION | UE→HSS/VLR→HLR | #1 | ·HLR → UE PASSWORD ACQUIRED (TOTAL 3 TIMES OF CURRENT/NEW/ NEW (AGAIN)) |
| | CB SETTING/SETTING CANCELLATION (TRANSMISSION REGULATION) | UE→HSS/VLR→HLR | #2 | ·HLR → UE PASSWORD ACQUIRED (1 TIME OF CURRENT) ·HLR → HSS/VLR IS UPDATED BY MAP-STANDALONE.ISD |
| | CB SETTING/SETTING CANCELLATION (CALL ARRIVAL REGULATION) | UE→HSS/VLR→HLR | #2 | ·HLR → HSS/VLR NOT UPDATED |
| | INTERROGATE (TRANSMISSION REGULATION) | UE→HSS/VLR | #5 | ·HLR ACCESS IS UNNECESSARY |
| | INTERROGATE (CALL ARRIVAL REGULATION) | UE→HSS/VLR→HLR | #4 | ·HLR IS INTERROGATED ON CALL ARRIVAL REGULATION |

# COMMUNICATION SYSTEM AND APPARATUS FOR PROVIDING SUPPLEMENTARY SERVICE IN FEMTO CELL

CROSS-REFERENCE TO RELATED APPLICATIONS

This application is a Divisional of U.S. patent application Ser. No. 13/377,730, filed on Dec. 12, 2011, which is a National Stage of International Application No. PCT/JP2010/061138, filed on Jun. 30, 2010, which claims priority from Japanese Patent Application No. 2009-157836 filed Jul. 2, 2009, the contents of all of which are incorporated herein by reference in their entirety.

TECHNICAL FIELD

The present invention relates to a femto cell base station, a gateway system, a MAP gateway (GW) apparatus, a communication system and a program of a method and apparatus used in a communication system provided with a function of providing various predetermined supplementary services such as call arrival regulation and call forwarding setting to a radio terminal (UE; user equipment).

BACKGROUND ART

In a 3G (third generation: third generation mobile communication) network as an existing public mobile communication network that connects a call of a UE, such as a cellular phone set, supplementary services, such as call arrival regulation and call forwarding setting, are generally made available through user settings.

Furthermore, there is a system made up of the existing 3G network connected to a core network based on an IMS (IP Multimedia Subsystem) network in which an MSC-IWF (Mobile Switching Center-Inter Working Function) in the existing 3G network performs signal conversion and thereby provides supplementary services such as CB (Call Barring), CLIR (Calling Line Identification Restriction) (e.g., see Patent Literature 1).

Furthermore, the possibility of a femto cell that allows access to a mobile communication core network via a wired channel installed in a home, office or the like is attracting attention in recent years.

The femto cell is designed to wirelessly connect UE through a femto cell base station (Femto AP) that covers a narrow communication area having a radius on the order of several tens of meters and mainly covers a communication area in a room such as a home or office. This makes it possible to cover a communication area without incurring cost for infrastructure construction of an existing macro cell base station (e.g., see Patent Literature 2).

CITATION LIST

Patent Literature

Patent Literature 1: JP2007-311951A
Patent Literature 2: JP2009-504051A

SUMMARY OF INVENTION

Technical Problem

However, aforementioned Patent Literature 1 and the existing 3G network do not go so far as to consider a configuration in which a femto cell is introduced. Therefore, even if an attempt is made to realize a supplementary service such as the existing public mobile communication network, it has not been possible to make a signal from the femto cell base station recognizable by the core network.

Furthermore, the femto cell base station in aforementioned Patent Literature 2 does not go so far as to consider realization of a supplementary service similar to that of the existing public mobile communication network using the femto cell base station.

It is an object of the present invention to provide a technique capable of realizing, in a femto cell, a supplementary service similar to that in the existing public mobile communication network.

Solution to Problem

In order to attain the above described object, the femto cell base station according to the present invention is a femto cell base station used for a communication system provided with a function of providing a predetermined supplementary service, including first converting means for converting, upon receiving first information indicating supplementary service control from a radio terminal, the received information to a SIP (Session Initiation Protocol) message including the first information, and first transmitting means for transmitting the SIP message converted by the first converting means to a higher apparatus in the communication system.

Furthermore, the short message gateway apparatus according to the present invention is a short message gateway apparatus used for a communication system provided with a function of providing a predetermined supplementary service, including first determining means for determining, upon receiving a SIP message, whether the message is to be transmitted to a core apparatus included in a core network of the communication system or to be transmitted to an apparatus not included in the core network and second transmitting means for transmitting content of the SIP message determined by the first determining means to be transmitted to the core apparatus to the core apparatus.

Furthermore, the MAP (Mobile Application Part) gateway apparatus according to the present invention is a MAP gateway apparatus used for a communication system provided with a function of providing a predetermined supplementary service, including second determining means for determining whether or not a received message includes second information indicating supplementary service control and third transmitting means for transmitting, when the second determining means determines that the second information is included, a message corresponding to the second information to an HLR (Home Location Register).

Furthermore, the communication system according to the present invention is a communication system provided with a function of providing a predetermined supplementary service, including the aforementioned femto cell base station according to the present invention, the aforementioned short message gateway apparatus according to the present invention and the aforementioned MAP gateway apparatus according to the present invention.

Furthermore, the communication control method according to the present invention is a communication control method in a communication system provided with a function of providing a predetermined supplementary service, performing first conversion processing of converting, when a femto cell base station receives first information indicating supplementary service control from a radio terminal, the received information to a SIP (Session Initiation Protocol)

message including the first information, and first transmission processing by the femto cell base station of transmitting the SIP message converted by the first conversion processing to a higher apparatus in the communication system.

Furthermore, another communication control method according to the present invention is a communication control method in a communication system provided with a function of providing a predetermined supplementary service, performing first determining processing of determining, when a gateway system making up the communication system receives a message by a SIP (Session Initiation Protocol), whether the message is to be transmitted to a core apparatus included in a core network of the communication system or to be transmitted to an apparatus not included in the core network, and second transmission processing by the gateway system of transmitting contents of the SIP message, determined by the first determining processing to be transmitted to the core apparatus, to the core apparatus.

Furthermore, a further communication control method according to the present invention is a communication control method in a communication system provided with a function of providing a predetermined supplementary service, performing second determining processing by a MAP (Mobile Application Part) gateway apparatus of determining whether or not a received message includes second information indicating supplementary service control and performing, when the second information is determined to be included through the second determining processing, third transmission processing by the MAP gateway apparatus of transmitting a message corresponding to the second information to an HLR (Home Location Register).

Furthermore, the program of a femto cell base station according to the present invention is a program of a femto cell base station in a communication system provided with a function of providing a predetermined supplementary service, causing a computer of the femto cell base station to execute first conversion processing of converting, upon receiving first information indicating supplementary service control from a radio terminal, the received information to a SIP (Session Initiation Protocol) message including the first information, and first transmission processing of transmitting the SIP message converted by the first conversion processing to a higher apparatus in the communication system.

Furthermore, the program of a short message gateway apparatus according to the present invention is a program of a short message gateway apparatus in a communication system provided with a function of providing a predetermined supplementary service, causing a computer of the short message gateway apparatus to execute first determining processing of determining, upon receiving a message by a SIP (Session Initiation Protocol), whether the message is to be transmitted to a core apparatus included in a core network of the communication system or to be transmitted to an apparatus not included in the core network, and second transmission processing of transmitting content of the SIP message, determined by the first determining processing to be transmitted to the core apparatus, to the core apparatus.

Furthermore, the program of a MAP (Mobile Application Part) gateway apparatus according to the present invention is a program of a MAP gateway apparatus used for a communication system provided with a function of providing a predetermined supplementary service, causing a computer of the MAP gateway apparatus to execute second determining processing of determining whether or not a received message includes second information indicating supplementary service control and third transmission processing of transmitting, when the second determining processing determines that the second information is included, a message corresponding to the second information, to an HLR (Home Location Register).

BRIEF DESCRIPTION OF DRAWINGS

FIG. 3 is a diagram illustrating related data when mapping information on SS control to a SIP message.

FIG. 4 is a diagram illustrating a service menu list of SS control.

DESCRIPTION OF EMBODIMENTS

Next, an exemplary embodiment to which a femto cell base station, gateway system, MAP gateway (GW) apparatus, communication system, and program of a method and apparatus according to the present invention is applied will be described in detail with reference to the accompanying drawings.

The present exemplary embodiment illustrates a preferred case where a femto cell base station (Femto AP; Femto Access Point) connects a call of a UE which is a radio terminal and, which can realize various supplementary services similar to those in the existing public mobile communication network within a range defined in a standard such as 3GPP (3rd Generation Partnership Project).

Figure 1:
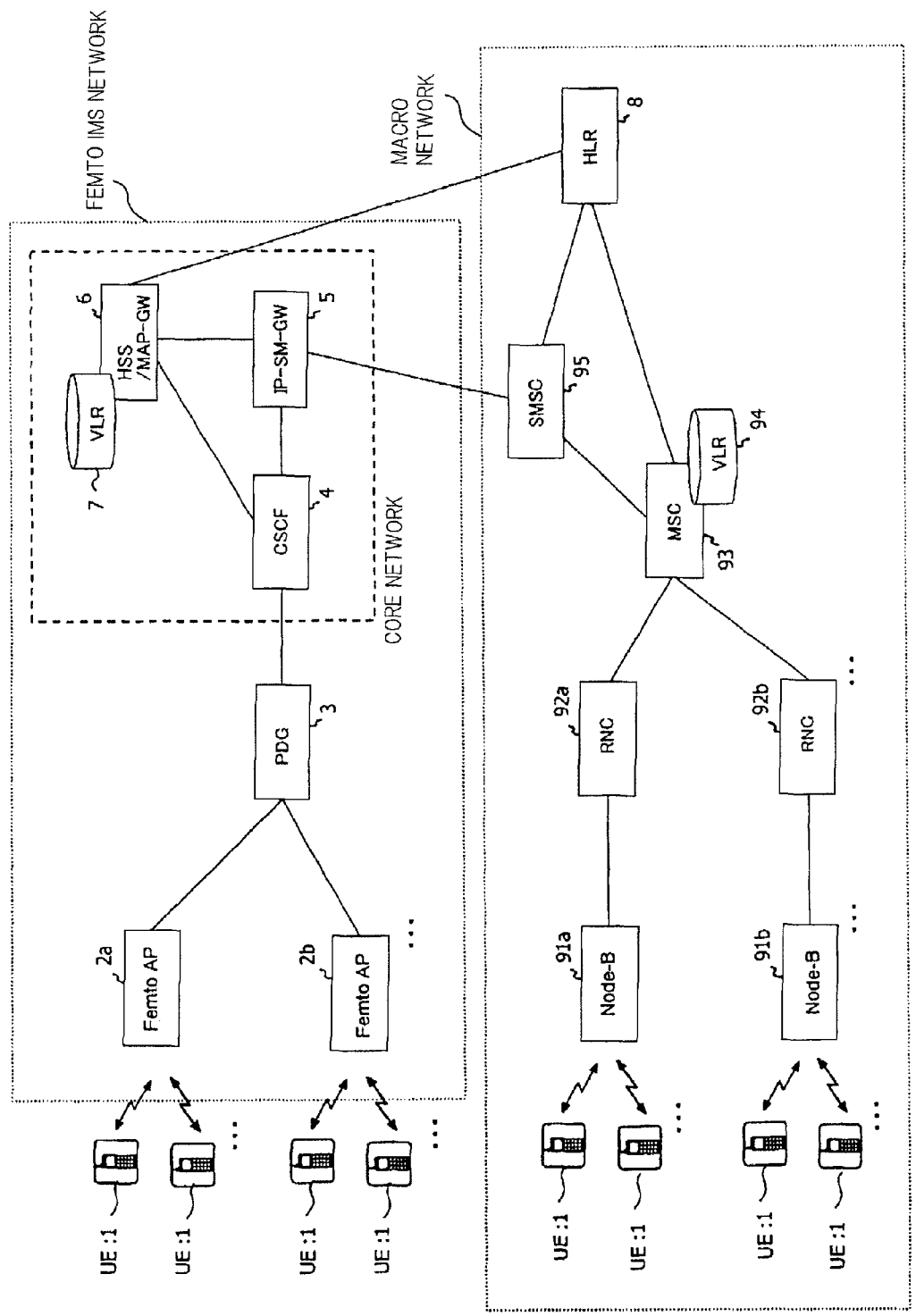
FIG. 1 is a block diagram illustrating a configuration example of a communication system as an exemplary embodiment.

As shown in FIG. 1, the communication system of the present exemplary embodiment is configured by including a macro network and a Femto IMS (IP Multimedia subsystem) network.

The macro network is a publicly known existing 3G network. The macro network is configured by including UE (User Equipment) 1, Node-B 91, RNC (Radio Network Controller) 92, MSC (Mobil Services Switching Centre) 93, VLR (Visitor Location Register) 94, SMSC (Short Message Service Center) 95 and HLR (Home Location Register) 8.

Since UE 1, Node-B 91, RNC 92, MSC 93, VLR 94, SMSC 95 and HLR 8 making up the macro network are apparatuses that perform processing compliant with the 3GPP, detailed descriptions of their processing operations will be omitted. The techniques used in the existing macro network are disclosed, for example, in 3GPP TS 33.234 V8.0.0 (2007-12).

The Femto IMS network is constructed of Femto AP 2 constituting a predetermined communication area and PDG (Packet Data Gateway) 3 that connects between Femto APs 2 via a network, both being connected to a core network.

The core network is configured by including call state control server (CSCF; Call Session Control Function) 4, IP short message gateway apparatus (IPSMGW; IP Short Message Gateway) 5, HSS/MAPGW (Home Subscriber Server/Mobile Application Part Gateway) (core apparatus) 6.

Femto AP 2 is a small radio base station that covers a narrow communication area having a radius on the order of several tens of meters.

PDG 3 is an apparatus that relays a message.

CSCF 4 has functions such as session control, management, authentication, routing using a SIP (Session Initiation Protocol).

IPSMGW 5 performs delivery control of a short message, determination of supplementary service control information and delivery control.

HSS/MAPGW 6 has VLR (Visitor Location Register) 7 and manages subscriber information of UE 1 connected to the Femto IMS network. HSS/MAPGW 6 acquires subscriber information of UE 1 from HLR 8, and stores and manages the acquired subscriber information of UE 1 in VLR 7.

Furthermore, HSS/MAPGW 6 is provided with an MAPGW function (MAPGW apparatus) that connects channels based on a non-MAP protocol such as DIAMETER and channels based on a MAP protocol and mutually converts signals based on the non-MAP protocol and signals based on the MAP protocol. Thus, HSS/MAPGW 6 is configured by the HSS incorporating the MAPGW function.

Next, an overview of the operation according to the present exemplary embodiment will be described.

According to the present exemplary embodiment, when Femto AP 2 receives a signal based on the 3GPP specification transmitted from UE 1, Femto AP 2 includes the received information in a request message using a MESSAGE method of a SIP and transmits the request message to IPSMGW 5.

The SIP message defines various methods indicating the type of request. Upon receiving supplementary service identification information for supplementary service (SS; supplementary service) control from UE 1, Femto AP 2 of the present exemplary embodiment converts the supplementary service identification information to a SIP message including the supplementary service identification information and transmits the SIP message to IPSMGW 5 using the MESSAGE method. Furthermore, Femto AP 2 sets the value of a CPC (Calling Party's Category) parameter, which will be described later, to notification.

This allows the converted SIP message to pass through CSCF 4, be transmitted to IPSMGW 5, relayed and transmitted to HSS/MAPGW 6 which is the core network.

Figure 2:
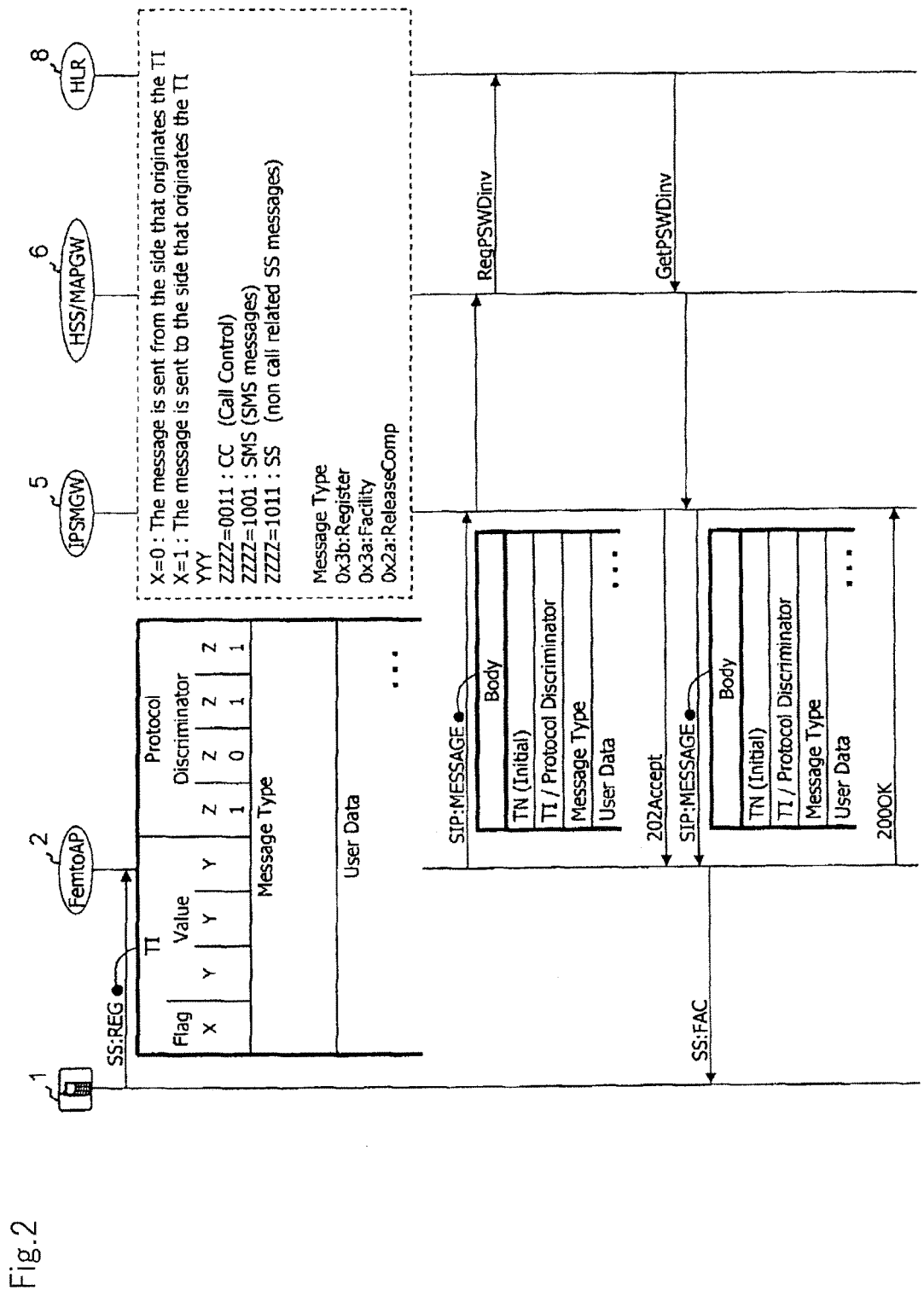
FIG. 2 is a diagram illustrating a mapping example of information transmitted from UE 1 to a SIP message.

FIG. 2 shows a mapping example of information transmitted from UE 1 to the SIP message.

The information transmitted from UE 1 follows a known format based on the 3GPP specification. As shown in FIG. 2, the transmission format from this UE 1 is provided with a TI (Transaction ID) section, a Protocol Discriminator section, a Message Type section and a User Data section.

When UE 1 transmits information for SS control, supplementary service identification information indicating the SS control is stored in the Protocol Discriminator section. In the example shown in FIG. 2, the value of ZZZZ=1011 corresponds to this supplementary service identification information.

When the information for the SS control is transmitted from UE 1 in this way, Femto AP 2 includes the contents received from UE 1 in the Body section of the SIP message as shown in the example in FIG. 2 and transmits the SIP message to IPSMGW 5.

The information stored in the Body section of a request message as Protocol Discriminator is not limited to the above described example of ZZZZ=1011 and may follow various data formats as long as it is predetermined as supplementary service identification information indicating SS control.

Furthermore, when a message for using a Short Message Service (SMS) is transmitted from UE 1, the value of Protocol Discriminator in that message indicates SMS and is ZZZZ=1001 in the example of FIG. 2.

When such information to use SMS is transmitted from UE 1, Femto AP 2 includes the value of Protocol Discriminator in the Body section of the SIP message as one indicating SMS as described above, as shown in the example in FIG. 2, and transmits the SIP message to IPSMGW 5.

Upon receiving the SIP message from Femto AP 2, IPSMGW 5 determines whether the received SIP message indicates SMS or SS control depending on the value of this Protocol Discriminator.

When the received SIP message indicates SMS, IPSMGW 5 sets the destination to SMSC 95, and when the received SIP message indicates SS control, IPSMGW 5 performs control so that the destination is set to HSS/MAPGW 6.

TN in the Body section of the SIP message shown in FIG. 2 stands for Transaction Number. Since TN is added at the start of the Body section, TN is expressed as TN (Initial) in FIG. 2.

TN is information mainly used for recognition by each apparatus in a distribution section up to Femto AP 2, IPSMGW 5, HSS/MAPGW 6, but not transmitted/received to/from UE 1. Transaction ID is information recognized in the distribution section from UE 1 to HSS/MAPGW 6, but not recognized by IPSMGW 5.

As shown in FIG. 2, when Femto AP 2 receives a signal from UE 1 and maps the received information to the Body section of the SIP message, "TN="00 00 00 00" initial" is added at the start and transmitted to IPSMGW 5.

When transmitting a reply message to Femto AP 2, IPSMGW 5 adds "TN="xx xx xx xx" (arbitrary)" at the start of the Body section.

Thus, if TN is "00 00 00 00," the apparatus which has received the message recognizes that the message is initial transmission in each transaction. Furthermore, TN="XX XX XX XX" is commonly used from initial transmission in each transaction onward and the apparatus which has received the message thereby recognizes that it is the same transaction.

FIG. 3 illustrates related data of the SIP message for Femto AP 2 to transmit/receive information of SS control to/from IPSMGW 5.

As shown in FIG. 3, the SIP message in the MESSAGE method transmitted from Femto AP 2 about SS control assumes that R-URI (Request-Uniform Resource Identifier) indicates the destination as the address of IPSMGW 5 as described above.

Furthermore, by setting the value of a CPC parameter in a PPI (P-Preferred ID) header to notification, supplementary service identification information for SS control is made to pass without being regulated by CSCF 4, as described above, and transmitted to IPSMGW 5.

Thus, by setting the value of the CPC parameter to notification, it is possible to transmit the SIP message to the core network irrespective of the presence/absence of a predetermined transmission regulation such as ODB (Operator Determined Barring). This allows the value of the CPC parameter to function as identification information that is not to be regulated.

Here, for example, even when the value of the CPC parameter is set to priority, it is possible to allow the SIP message to pass through CSCF 4 irrespective of the presence/absence of a transmission regulation and transmit the SIP message to IPSMGW 5. However, in this case, since the SIP message is handled as a priority subscriber, there is a problem that part of the regulation is not performed sufficiently even when transmission regulation is preferred such that a transmission regulation is not performed well even if the transmission regulation is needed by congestion.

By contrast, the present exemplary embodiment sets the value of the CPC parameter to notification, and can thereby allow the SIP message to pass through the CSCF without such problems with the regulation. Thus, it is possible to transmit the SIP message converted so as to include supplementary service identification information from UE 1 to IPSMGW 5 irrespective of the presence/absence of a predetermined transmission regulation.

Furthermore, the BODY section of the SIP message shown in FIG. 3 includes contents from TI onward in the data format transmitted from UE 1 as described above in FIG. 2.

Next, a service menu example of SS control will be described with reference to FIG. 4. Examples of supplementary services (SS) realized in the Femto IMS network of the present exemplary embodiment in the same way as in the existing 3G network include CF (Call Forwarding), CW (Call Waiting), CLIP (Calling Line Identification Presentation), CLIR (Calling Line Identification Presentation) and CB (Call Barring).

The transmission route of information on supplementary service control transmitted from UE 1 varies depending on each service menu such as necessity of access to HLR 8 to realize the supplementary service. Thus, the operation of patterns of Types #1 to #5 in FIG. 4 will be described with reference to sequence diagrams in FIG. 5 to FIG. 14 below.

First, the operation in the case of Type #1 in FIG. 4, that is, in the case where a supplementary service request such as password registration is transmitted from UE 1, will be described with reference to a sequence diagram in FIG. 5. In the following operation example, a case where a password change request is inputted from the user will be described.

When connected to Femto AP 2 through radio communication (step A1), UE 1 transmits a password change request to Femto AP 2 using a signal whose Message Type is Register and whose Protocol Discriminator is SS (step A2).

Upon receiving information indicating supplementary service control (first information), that is, a password change request from UE 1, Femto AP 2 maps the received content to the SIP message as described above and converts the SIP message to a SIP message of a MESSAGE method. Femto AP 2 then transmits the converted SIP message to IPSMGW 5 (step A3).

Upon receiving the password change request through the SIP message that uses the MESSAGE method from Femto AP 2, because Protocol Discriminator is SS, IPSMGW 5 determines that the destination of the received contents transmitted as a message is not SMSC 95 in the case of a short message but is HSS/MAPGW 6. Therefore, IPSMGW 5 maps the received contents to a message of a predetermined IP-based protocol such as DIAMETER and transmits the message of such a converted protocol to HSS/MAPGW 6 (step A4).

Furthermore, IPSMGW 5 sends a SIP message of 202 Accept back to Femto AP 2 (step A5).

Upon receiving the password change request from IPSMGW 5, HSS/MAPGW 6 transmits received message contents (second information), that is, Req-PSWD-inv which is a message of a method corresponding to the password change request to HLR 8 through an MAPGW function (step A6).

Upon receiving the password change request, HLR 8 transmits the current password request to HSS/MAPGW 6 (step A7).

Upon receiving the current password request from HLR 8, HSS/MAPGW 6 maps the received contents to a message of a protocol such as DIAMETER through the MAPGW function and transmits the message of such a converted protocol to IPSMGW 5 (step A8).

Upon receiving the current password request from HSS/MAPGW 6, IPSMGW 5 maps the received contents into the SIP message by setting Message Type to Facility and Protocol Discriminator to SS as described above, converts the received contents to a SIP message and transmits the SIP message to Femto AP 2 using a MESSAGE method (step A9).

Upon receiving the current password request from IPSMGW 5, Femto AP 2 maps the received content to a signal whose Message Type is Facility and whose Protocol Discriminator is SS, as opposed to the aforementioned mapping in FIG. 2 and transmits the current password request to UE 1 using such a converted signal (step A10).

Furthermore, Femto AP 2 sends a SIP message of 202 Accept back to IPSMGW 5 (step A11).

Thus, when the current password request is transmitted to UE 1 and the user inputs the current password to UE 1, UE 1 transmits the current password to Femto AP 2 using a signal whose Message Type is Facility and whose Protocol Discriminator is SS (step A12).

Upon receiving information indicating supplementary service control (first information), that is, the current password transmission request from UE 1, Femto AP 2 maps the received content to the SIP message as described above and converts the received content to a SIP message that uses the MESSAGE method. Then, Femto AP 2 transmits the converted SIP message to IPSMGW 5 (step A13).

Upon receiving the current password transmission request through the SIP message in the MESSAGE method from Femto AP 2, because Protocol Discriminator is SS, IPSMGW 5 determines that the destination of the received content to be transmitted as a message is not SMSC 95 in the case of a short message but is HSS/MAPGW 6. Therefore, IPSMGW 5 maps the received content to a message of a predetermined IP-based protocol such as DIAMETER and transmits the message of such a converted protocol to HSS/MAPGW 6 (step A14).

Furthermore, IPSMGW 5 sends a SIP message of 202 Accept back to Femto AP 2 (step A15).

Upon receiving the current password transmission request from IPSMGW 5, HSS/MAPGW 6 transmits the received message content (second information), that is, Get-PSWD-ack which is a message of the method corresponding to the current password transmission request to HLR 8 through the MAPGW function (step A16).

Upon receiving the current password transmission request, HLR 8 compares the current password with the password of the user stored in the apparatus and transmits, if the transmitted current password is a correct one, a new password request to HSS/MAPGW 6 (step A17).

Upon receiving the new password request from HLR 8, HSS/MAPGW 6 maps the received content to a message of a protocol such as DIAMETER through the MAPGW function and transmits the message of such a converted protocol to IPSMGW 5 (step A18).

Upon receiving the new password request from HSS/MAPGW 6, IPSMGW 5 maps the received contents into the SIP message by setting Message Type to Facility and Protocol Discriminator to SS as described above, converts the received contents to a SIP message and transmits the SIP message to Femto AP 2 using the MESSAGE method (step A19).

Upon receiving the new password request from IPSMGW 5, Femto AP 2 maps the received contents to a signal whose Message Type is Facility and whose Protocol Discriminator is SS as opposed to the aforementioned mapping in FIG. 2 and transmits a new password request to UE 1 using such a converted signal (step A20).

Furthermore, Femto AP 2 sends a SIP message of 202 Accept back to IPSMGW 5 (step A21).

Thus, when the new password request is transmitted to UE 1 and the user inputs the new password to UE 1, UE 1 transmits the new password to Femto AP 2 using a signal whose Message Type is Facility and whose Protocol Discriminator is SS (step A22).

Upon receiving information indicating supplementary service control (first information), that is, the new password transmission request from UE 1, Femto AP 2 maps the received contents to the SIP message as described above and converts the received contents to a SIP message in a MESSAGE method. Then, Femto AP 2 transmits the converted SIP message to IPSMGW 5 (step A23).

Upon receiving the new password transmission request through the SIP message using the MESSAGE method from Femto AP 2, because Protocol Discriminator is SS, IPSMGW 5 determines that the destination of the received content to be transmitted as a message is not SMSC 95 in the case of a short message but is HSS/MAPGW 6. Therefore, IPSMGW 5 maps the received content to a message of a predetermined IP-based protocol such as DIAMETER and transmits the message of such a converted protocol to HSS/MAPGW 6 (step A24).

Furthermore, IPSMGW 5 sends a SIP message of 202 Accept back to Femto AP 2 (step A25).

Upon receiving the new password transmission request from IPSMGW 5, HSS/MAPGW 6 transmits the received message contents (second information), that is, Get-PSWD-ack which is a message of a method corresponding to the new password transmission request to HLR 8 through the MAPGW function (step A26).

Upon receiving the new password transmission request, HLR 8 associates the password of the user stored in the apparatus with the received new password and stores it.

HLR 8 then transmits a new password retransmission request to HSS/MAPGW 6 (step A27).

Upon receiving the new password retransmission request from HLR 8, HSS/MAPGW 6 maps the received contents to a message of a protocol such as DIAMETER through the MAPGW function and transmits the message of such a converted protocol to IPSMGW 5 (step A28).

Upon receiving the new password retransmission request from HSS/MAPGW 6, IPSMGW 5 maps the received contents into the SIP message by setting Message Type to Facility and Protocol Discriminator to SS as described above, converts the received contents to a SIP message and transmits the SIP message to Femto AP 2 using the MESSAGE method (step A29).

Upon receiving the new password retransmission request from IPSMGW 5, Femto AP 2 maps the received content to a signal whose Message Type is Facility and whose Protocol Discriminator is SS as opposed to the aforementioned mapping in FIG. 2 and transmits the new password retransmission request to UE 1 using such a converted signal (step A30).

Furthermore, Femto AP 2 sends a SIP message of 202 Accept back to IPSMGW 5 (step A31).

Thus, when the new password retransmission request is transmitted to UE 1 and the user inputs a new password to UE 1 again, UE 1 transmits the second new password inputted to Femto AP 2 using a signal whose Message Type is Facility and whose Protocol Discriminator is SS (step A32).

Upon receiving information indicating supplementary service control (first information), that is, the new password transmission request from UE 1, Femto AP 2 maps the received contents to the SIP message as described above and converts the received contents to a SIP message in the MESSAGE method. Femto AP 2 transmits the converted SIP message to IPSMGW 5 (step A33).

Upon receiving the new password transmission request through the SIP message of the MESSAGE method from Femto AP 2, because Protocol Discriminator is SS, IPSMGW 5 determines that the destination of the received contents to be transmitted as a message is not SMSC 95 in the case of a short message but is HSS/MAPGW 6. Thus, IPSMGW 5 maps the received contents to a message of a predetermined IP-based protocol such as DIAMETER and transmits the message of such a converted protocol to HSS/MAPGW 6 (step A34).

Furthermore, IPSMGW 5 sends a SIP message of 202 Accept back to Femto AP 2 (step A35).

Upon receiving the new password transmission request from IPSMGW 5, HSS/MAPGW 6 transmits the received message contents (second information), that is, Get-PSWD-ack which is a message of a method corresponding to the new password transmission request to HLR 8 through the MAPGW function (step A36).

Upon receiving the new password transmission request, HLR 8 compares the new password with the new password stored in association with the password of the user, overwrites, when the password is identical to the received new password, the password of the user in the user information database with the received new password and transmits Req-PSWD-ack to HSS/MAPGW 6 as a reply indicating the completion of password update (steps A37 and A38).

Upon receiving a notice of completion of password update from HLR 8, HSS/MAPGW 6 maps the received contents to a message of a protocol such as DIAMETER through the MAPGW function and transmits the message of such a converted protocol to IPSMGW 5 (step A39).

Upon receiving of the notice of completion of password update from HSS/MAPGW 6, IPSMGW 5 maps the received contents into the SIP message by setting Message Type to Release Comp and Protocol Discriminator to SS as described above, converts the received contents to a SIP message and transmits the SIP message to Femto AP 2 using the MESSAGE method (step A40).

Upon receiving the notice of completion of password update from IPSMGW 5, Femto AP 2 maps the received contents to a signal whose Message Type is Release Comp and whose Protocol Discriminator is SS as opposed to the aforementioned mapping in FIG. 2 and transmits the notice of completion of password update to UE 1 using such a converted signal (step A41).

Furthermore, Femto AP 2 sends a SIP message of 200 OK back to IPSMGW 5 (step A42).

When the notice of completion of password update is transmitted to UE 1 in this way, UE 1 cancels the communication connection with Femto AP 2 (step A43) and notifies the completion of password update to the user through screen display or the like.

Figure 5:
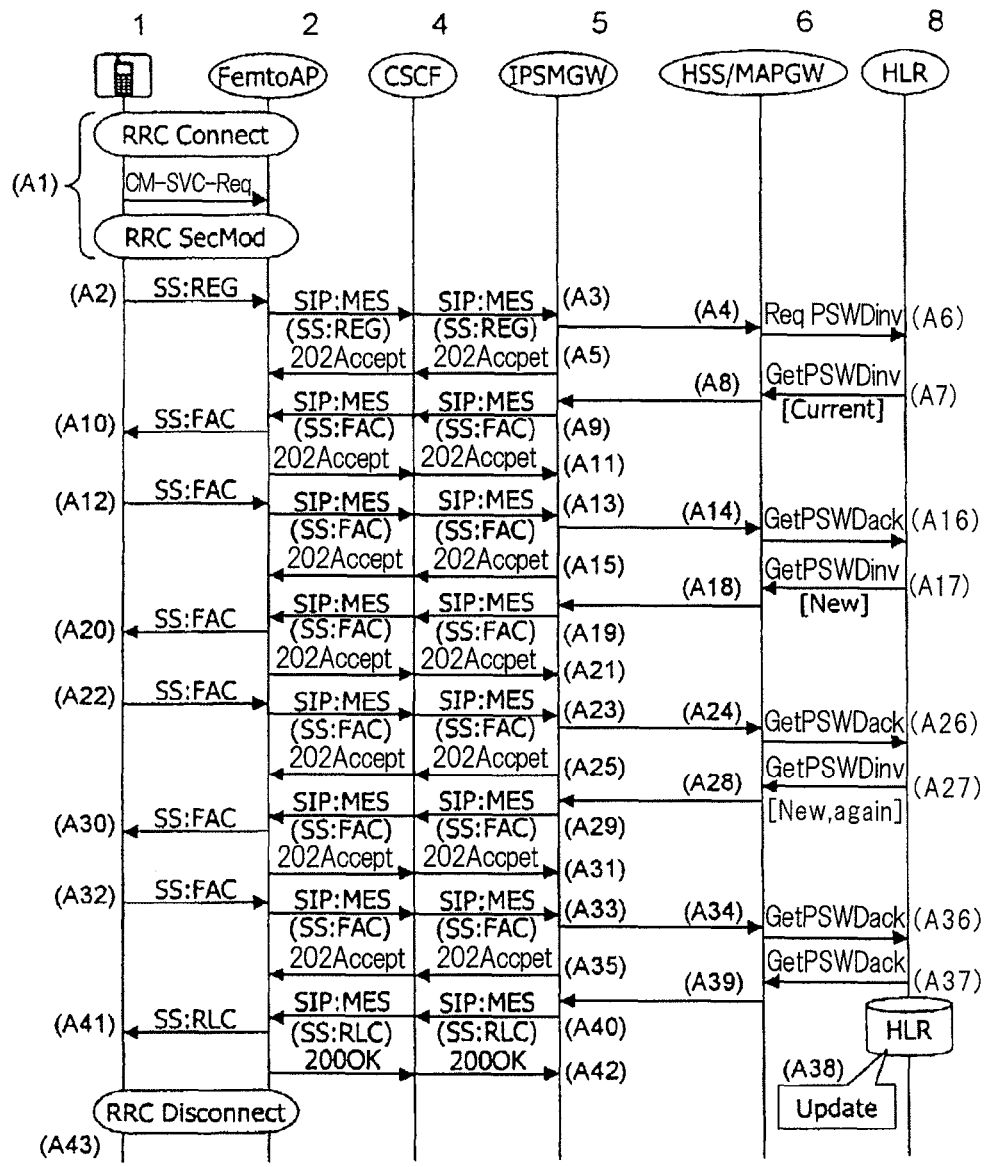
FIG. 5 is a sequence diagram illustrating an operation example in the case of Type #1 in FIG. 4.

In the aforementioned operation example in FIG. 5, steps A2 to A11, steps A12 to A21, steps A22 to A31 and steps A32 to A42 each make up one transaction and these transactions are managed by the aforementioned TI (Transaction ID).

Figure 6:
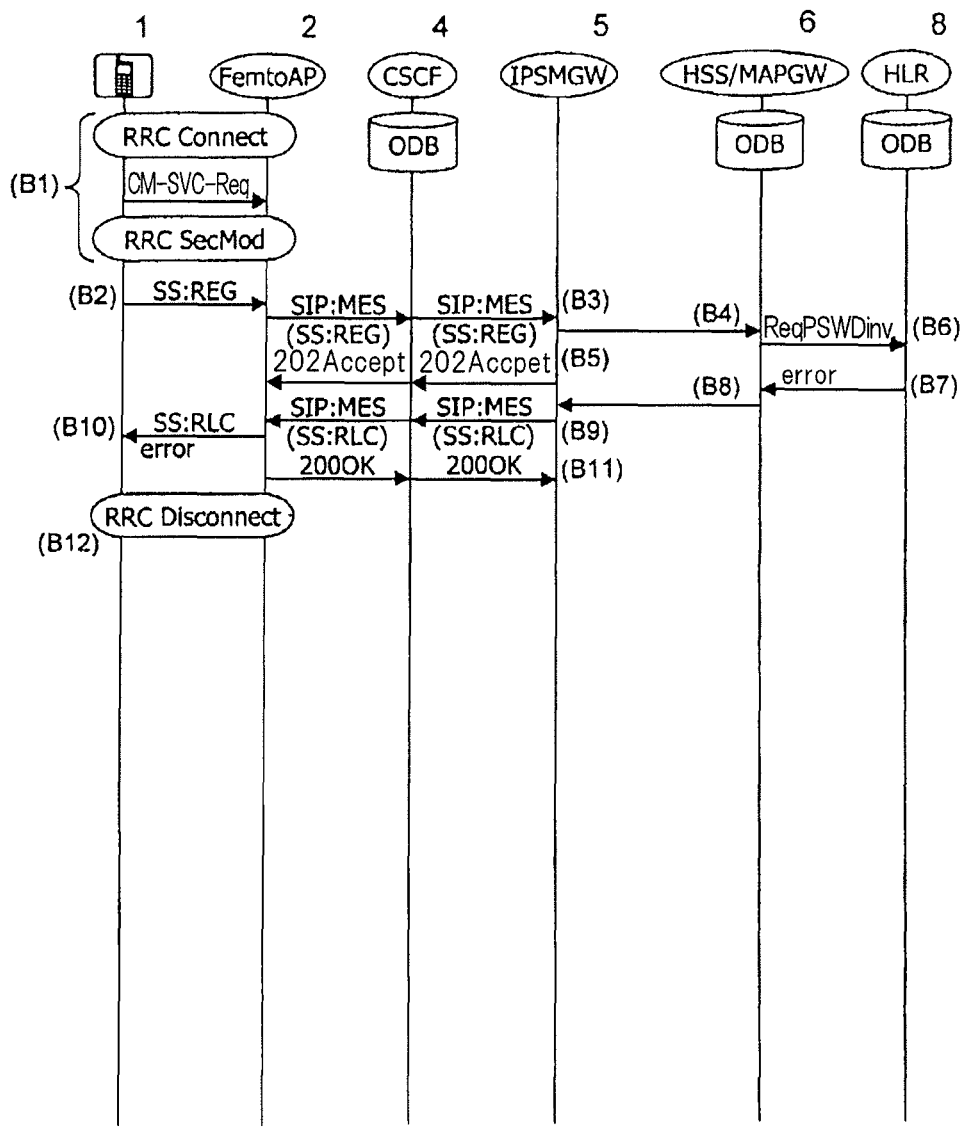
FIG. 6 is a sequence diagram illustrating an operation example in the case of Type #1 in FIG. 4 where ODB is set.

Next, the case of Type #1 in FIG. 4, that is, for example, the case of the operation where a supplementary service request such as password change registration is transmitted from UE 1 and a transmission regulation by ODB is set will be described with reference to a sequence diagram in FIG. 6.

The operation in steps B1 to B6 is similar to the operation in steps A1 to A6 in the aforementioned sequence diagram in FIG. 5.

That is, even when ODB is set, the value of a CPC parameter is set to notification as described above, and therefore a password change request from UE 1 is transmitted to HLR 8 without being regulated by ODB in CSCF 4.

Upon receiving the password change request, HLR 8 refers to the user information database in the apparatus, and because ODB is set, HLR 8 transmits an error message to HSS/MAPGW 6 (step B7).

Upon receiving the error from HLR 8, HSS/MAPGW 6 maps the received contents to a message of a protocol such as DIAMETER through the MAPGW function and transmits the message of such a converted protocol to IPSMGW 5 (step B8).

Upon receiving the error from HSS/MAPGW 6, IPSMGW 5 maps the received content into the SIP message by setting Message Type to Release Comp and Protocol Discriminator to SS, as described above, converts the received content to a SIP message and transmits the SIP message to Femto AP 2 using the MESSAGE method (step B9).

Upon receiving the error from IPSMGW 5, Femto AP 2 maps the received content to a signal whose Message Type is Release Comp and whose Protocol Discriminator is SS as opposed to the aforementioned mapping in FIG. 2 and transmits the error to UE 1 using such a converted signal (step B10).

Furthermore, Femto AP 2 sends a SIP message of 200 OK back to IPSMGW 5 (step B11).

Thus, when the error is transmitted to UE 1, UE 1 cancels the communication connection with Femto AP 2 (step B12) and also notifies that the password change was not accepted through screen display or the like.

Next, the operation in the case of Type #2 in FIG. 4, that is, the case where a supplementary service request such as CB setting, setting cancellation, pause or pause cancellation is transmitted from UE 1, will be described with reference to a sequence diagram in FIG. 7. In the following operation example, an example where a CB setting request is inputted from the user will be described.

When connected to Femto AP 2 through radio communication (step C1), UE 1 transmits a CB setting request to Femto AP 2 using a signal whose Message Type is Register and whose Protocol Discriminator is SS (step C2).

Upon receiving information indicating supplementary service control (first information), that is, a CB setting request from UE 1, Femto AP 2 maps the received content to the SIP message as described above and converts the received content to a SIP message in the MESSAGE method. Femto AP 2 then transmits the converted SIP message to IPSMGW 5 (step C3).

Upon receiving the CB setting request from Femto AP 2 through the SIP message in the MESSAGE method, because Protocol Discriminator is SS, IPSMGW 5 determines that the destination of the received content to be transmitted as a message is not SMSC 95 in the case of a short message but is HSS/MAPGW 6. Thus, IPSMGW 5 maps the received contents to a message of a predetermined IP-based protocol such as DIAMETER and transmits the message of such a converted protocol to HSS/MAPGW 6 (step C4).

Furthermore, IPSMGW 5 sends a SIP message of 202 Accept back to Femto AP 2 (step C5).

Upon receiving the CB setting request from IPSMGW 5, HSS/MAPGW 6 transmits the received message contents (second information), that is, xSS-inv which is a message of a method corresponding to the CB setting request to HLR 8 through the MAPGW function (step C6).

Upon receiving the CB setting request, HLR 8 transmits the current password request to HSS/MAPGW 6 (step C7).

Upon receiving the current password request from HLR 8, HSS/MAPGW 6 maps the received content to a message of a protocol such as DIAMETER through the MAPGW function and transmits the message of such a converted protocol to IPSMGW 5 (step C8).

Upon receiving the current password request from HSS/MAPGW 6, IPSMGW 5 maps the received content into the SIP message by setting Message Type to Facility and Protocol Discriminator to SS, as described above, converts the received content to a SIP message and transmits the SIP message to Femto AP 2 using the MESSAGE method (step C9).

Upon receiving the current password request from IPSMGW 5, Femto AP 2 maps the received contents to a signal whose Message Type is Facility and whose Protocol Discriminator is SS as opposed to the aforementioned mapping in FIG. 2 and transmits the current password request to UE 1 using such a converted signal (step C10).

Furthermore, Femto AP 2 sends a SIP message of 202 Accept back to IPSMGW 5 (step C11).

Thus, when the current password request is transmitted to UE 1 and the user inputs the current password to UE 1, UE 1 transmits the current password to Femto AP 2 using a signal whose Message Type is Facility and whose Protocol Discriminator is SS (step C12).

Upon receiving information indicating supplementary service control (first information), that is, the current password from UE 1, Femto AP 2 maps the received content to the SIP message as described above and converts the received contents to a SIP message in the MESSAGE method. Femto AP 2 then transmits the converted SIP message to IPSMGW 5 (step C13).

Upon receiving the current password through the SIP message in the MESSAGE method from Femto AP 2, because Protocol Discriminator is SS, IPSMGW 5 determines that the destination of the received content that is transmitted as a message is not SMSC 95 in the case of a short message but is HSS/MAPGW 6. Therefore, IPSMGW 5 maps the received content to the message of a predetermined IP-based protocol such as DIAMETER and transmits the message of such a converted protocol to HSS/MAPGW 6 (step C14).

Furthermore, IPSMGW 5 sends a SIP message of 202 Accept back to Femto AP 2 (step C15).

Upon receiving the current password from IPSMGW 5, HSS/MAPGW 6 transmits the received message content (second information), that is, xSS-inv, which is a message of a method corresponding to the current password, to HLR 8 through the MAPGW function (step C16).

Upon receiving the current password, HLR 8 compares the current password with the password of the user stored in the apparatus, and if the transmitted current password is a correct one, HLR 8 transmits xSS-ack indicating completion of CB setting to HSS/MAPGW 6 as a reply (step C17).

Upon receiving a notice of completion of CB setting from HLR 8, HSS/MAPGW 6 maps the received content to a message of a protocol such as DIAMETER through the MAPGW function and transmits the message of such a converted protocol to IPSMGW 5 (step C18).

Upon receiving the notice of completion of CB setting from HSS/MAPGW 6, IPSMGW 5 maps the received content into the SIP message by setting Message Type to Release Comp and Protocol Discriminator to SS, as described above, converts the received content to a SIP message and transmits the SIP message to Femto AP 2 using the MESSAGE method (step C19).

Upon receiving the notice of completion of CB setting from IPSMGW 5, Femto AP 2 maps the received contents of a signal whose Message Type is Release Comp and whose Protocol Discriminator is SS as opposed to the aforementioned mapping in FIG. 2 and transmits the notice of completion of CB setting to UE 1 using such a converted signal (step C20).

Furthermore, Femto AP 2 sends a SIP message of 200 OK back to IPSMGW 5 (step C21).

Thus, when the notice of completion of CB setting is transmitted to UE 1, UE 1 cancels the communication connection with Femto AP 2 (step C22) and notifies completion of CB setting to the user through screen display or the like.

Furthermore, HLR 8 receives the current password in aforementioned step C16, and when the received current password is a correct one, HLR 8 transmits xSS-ack to HSS/MAPGW 6 in aforementioned step C17 and overwrites the CB setting information of the user in the user information database with content of the CB setting request received in step C6 (step C23).

HLR 8 then notifies the CB setting information update of the user to HSS/MAPGW 6 using ISD-inv (step C24).

Upon receiving the notice of the CB setting information update from HLR 8, HSS/MAPGW 6 sends ISD-ack back to HLR 8 (step C25) and also notifies the information of the CB setting information update to CSCF 4 (step C26).

Upon receiving the notice of CB setting information update from HSS/MAPGW 6, CSCF 4 sends the notice back to HSS/MAPGW 6 (step C27) and also overwrites the CB setting information of the user in the subscriber database in the apparatus with the content of the CB setting request received in step C26 (step C28).

Upon receiving a reply to the CB setting information update from CSCF 4 (step C27), HSS/MAPGW 6 overwrites the CB setting information of the user in VLR 7 with the content of the CB setting request received in step C24 (step C29).

Figure 8:
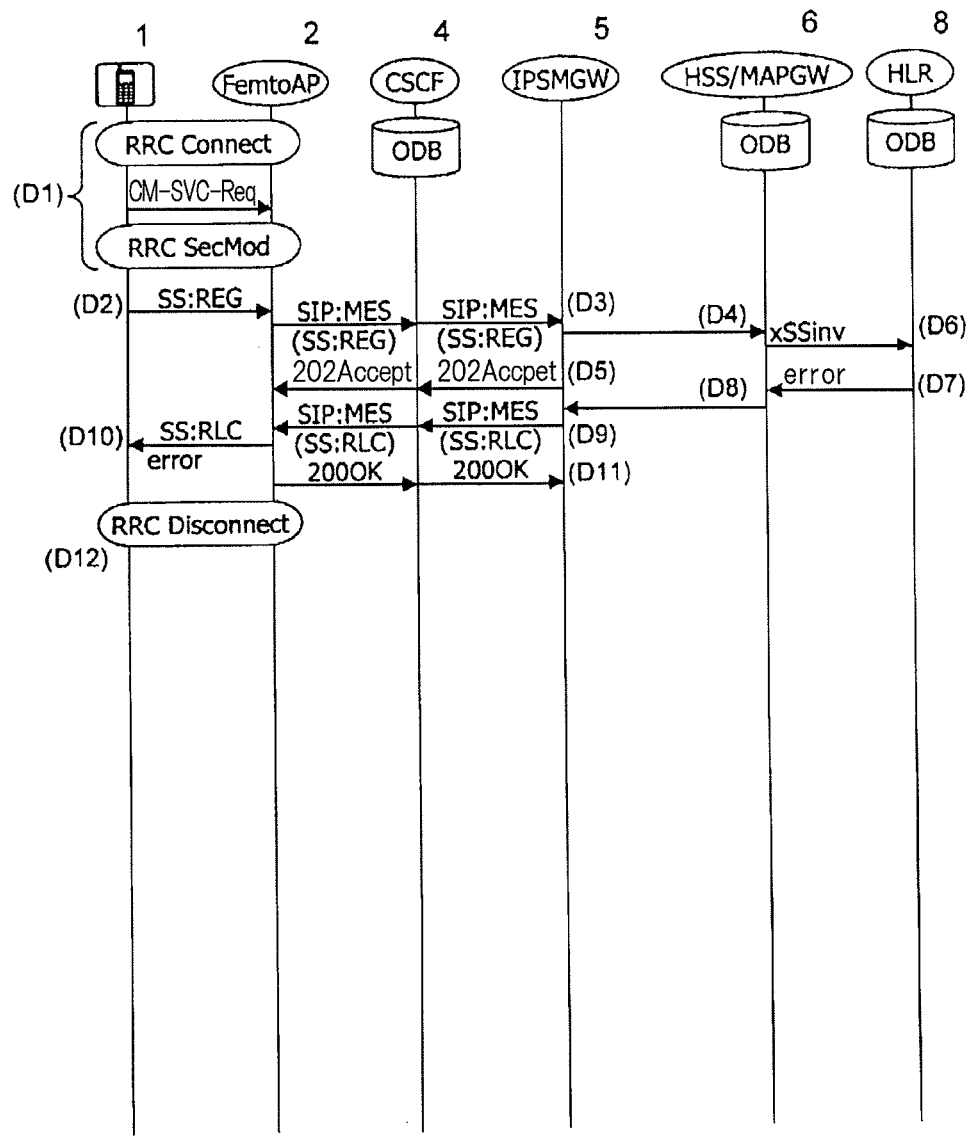
FIG. 8 is a sequence diagram illustrating an operation example in the case of Type #2 in FIG. 4 where ODB is set.

Next, the operation in the case of Type #2 in FIG. 4, that is, the case where a supplementary service request such as CB setting, setting cancellation, pause or pause cancellation is transmitted from UE 1 and a transmission regulation by ODB is set will be described with reference to a sequence diagram in FIG. 8.

Figure 7:
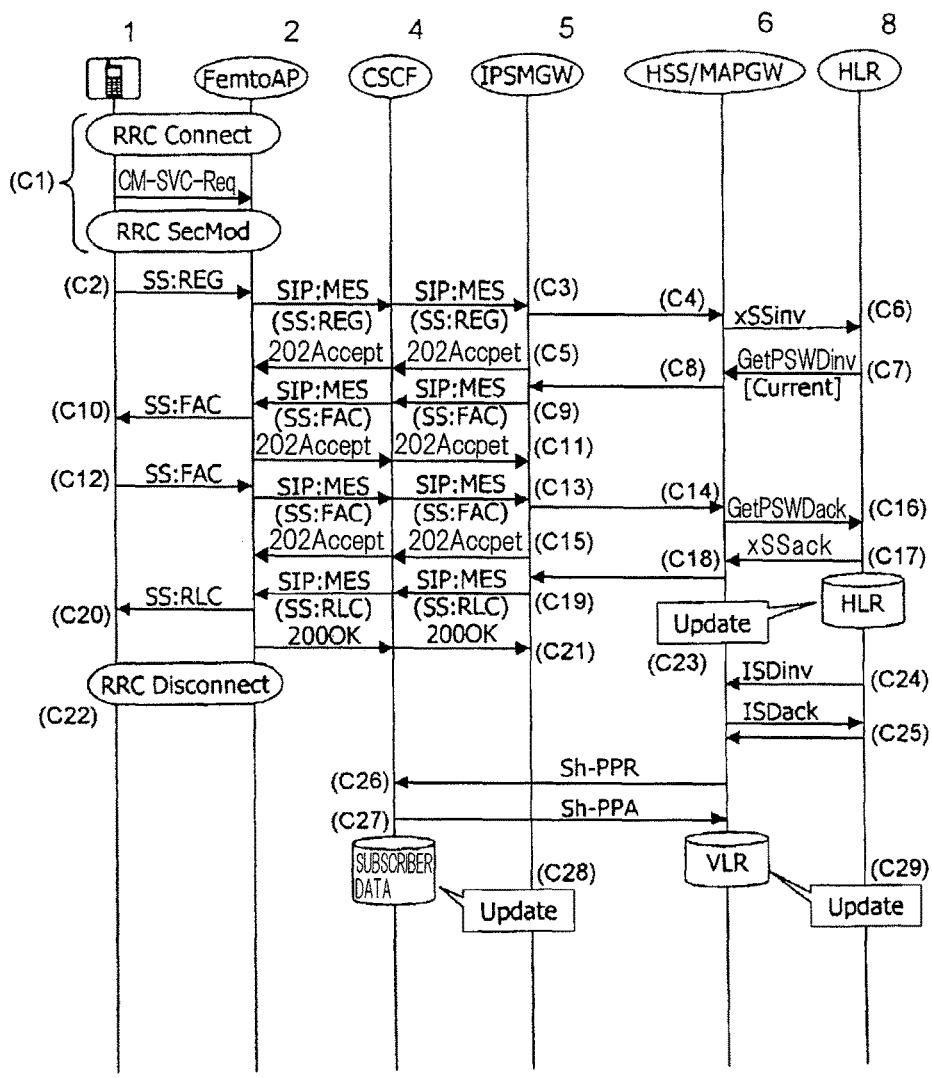
FIG. 7 is a sequence diagram illustrating an operation example in the case of Type #2 in FIG. 4.

The operation in steps D1 to D6 is similar to the operation in steps C1 to C6 of the aforementioned sequence diagram in FIG. 7.

That is, even in the case where ODB is set, since the value of a CPC parameter is set to notification as described above, the CB setting request from UE 1 is transmitted to HLR 8 without being regulated by ODB in CSCF 4.

Upon receiving the CB setting request, HLR 8 refers to the user information database in the apparatus and because ODB is set, HLR 8 transmits an error message to HSS/MAPGW 6 (step D7).

Upon receiving the error from HLR 8, HSS/MAPGW 6 maps the received contents to a message of a protocol such as DIAMETER through the MAPGW function and transmits the message of such a converted protocol to IPSMGW 5 (step D8).

Upon receiving the error from HSS/MAPGW 6, IPSMGW 5 maps the received contents into the SIP message by setting Message Type to Release Comp and Protocol Discriminator to SS as described above, converts the received contents to a SIP message and transmits the SIP message to Femto AP 2 using the MESSAGE method (step D9).

Upon receiving the error from IPSMGW 5, Femto AP 2 maps the received content to a signal whose Message Type is Release Comp and whose Protocol Discriminator is SS as opposed to the aforementioned mapping in FIG. 2 and transmits the error to UE 1 using such a converted signal (step D10).

Furthermore, Femto AP 2 sends a SIP message of 200 OK back to IPSMGW 5 (step D11).

When the error is transmitted to UE 1 in this way, UE 1 cancels the communication connection with Femto AP 2 (step D12) and also notifies the user through screen display or the like that a CB was not accepted.

Next, the operation in the case of Type #3 in FIG. 4, that is, the case where a supplementary service request such as CF and/or CW setting, setting cancellation, pause or pause cancellation is transmitted from UE 1 will be described with reference to a sequence diagram in FIG. 9.

Unlike the aforementioned case of Type #2 in FIG. 4, the operation example of Type #3 in FIG. 4 is an operation example where the user is not required to enter a password. In the following operation example, a case where the user enters a CF setting request will be described.

When connected to Femto AP 2 through radio communication (step E1), UE 1 transmits a CF setting request to Femto AP 2 using a signal whose Message Type is Register and whose Protocol Discriminator is SS (step E2).

Upon receiving information indicating supplementary service control (first information), that is, CF setting request from UE 1, Femto AP 2 maps the received content to the SIP message as described above and converts the received content to a SIP message in the MESSAGE method. Femto AP 2 then transmits the converted SIP message to IPSMGW 5 (step E3).

Upon receiving the CF setting request through the SIP message in the MESSAGE method from Femto AP 2, because Protocol Discriminator is SS, IPSMGW 5 determines that the destination of the received content to be transmitted as a message is not SMSC 95 in the case of a short message but is HSS/MAPGW 6. Thus, IPSMGW 5 maps the received content to a message of a predetermined IP-based protocol such as DIAMETER and transmits the message of such a converted protocol to HSS/MAPGW 6 (step E4).

Furthermore, IPSMGW 5 sends a SIP message of 202 Accept back to Femto AP 2 (step E5).

Upon receiving the CF setting request from IPSMGW 5, HSS/MAPGW 6 transmits the received message content (second information), that is, xSS-inv, which is a message of a method corresponding to the CF setting request, to HLR 8 through the MAPGW function (step E6).

Upon receiving the CF setting request, HLR 8 overwrites the CF setting information of the user in the user information database with the content of the CF setting request received in step E6 (step E13). HLR 8 then transmits xSS-ack as a reply indicating completion of CF setting to HSS/MAPGW 6 (step E7).

Upon receiving a notice of completion of CF setting from HLR 8, HSS/MAPGW 6 maps the received content to a message of a protocol such as DIAMETER through the MAPGW function and transmits the message of such a converted protocol to IPSMGW 5 (step E8).

Upon receiving the notice of completion of CF setting from HSS/MAPGW 6, IPSMGW 5 maps the received content into the SIP message by setting Message Type to Release Comp and Protocol Discriminator to SS, as described above, converts the received contents to a SIP message and transmits the SIP message to Femto AP 2 using the MESSAGE method (step E9).

Upon receiving the notice of completion of CF setting from IPSMGW 5, Femto AP 2 maps the received content to a signal whose Message Type is Release Comp and whose Protocol Discriminator is SS as opposed to the aforementioned mapping in FIG. 2 and transmits the notice of completion of CF setting to UE 1 using such a converted signal (step E10).

Furthermore, Femto AP 2 sends a SIP message of 200 OK back to IPSMGW 5 (step E11).

When the notice of completion of CF setting is transmitted to UE 1 in this way, UE 1 cancels the communication connection with Femto AP 2 (step E12) and also notifies the completion of CF setting to the user through screen display or the like.

Furthermore, HLR 8 overwrites the CF setting information of the user in the user information database in aforementioned step E13 and notifies the CF setting information update of the user to HSS/MAPGW 6 through ISD-inv (step E14).

Upon receiving the notice of the CF setting information update from HLR 8, HSS/MAPGW 6 sends ISD-ack back to HLR 8 (step E15) and also notifies the CF setting information update to CSCF 4 (step E16).

Upon receiving the notice of the CF setting information update from HSS/MAPGW 6, CSCF 4 sends the notice back to HSS/MAPGW 6 (step E17) and overwrites the CF setting information of the user in the subscriber database in the apparatus with the contents of the CF setting request received in step E16 (step E18).

Upon receiving the reply to the CF setting information update from CSCF 4 (step E17), HSS/MAPGW 6 overwrites the CF setting information of the user in VLR 7 with the contents of the CF setting request received in step E14 (step E19).

Figure 10:
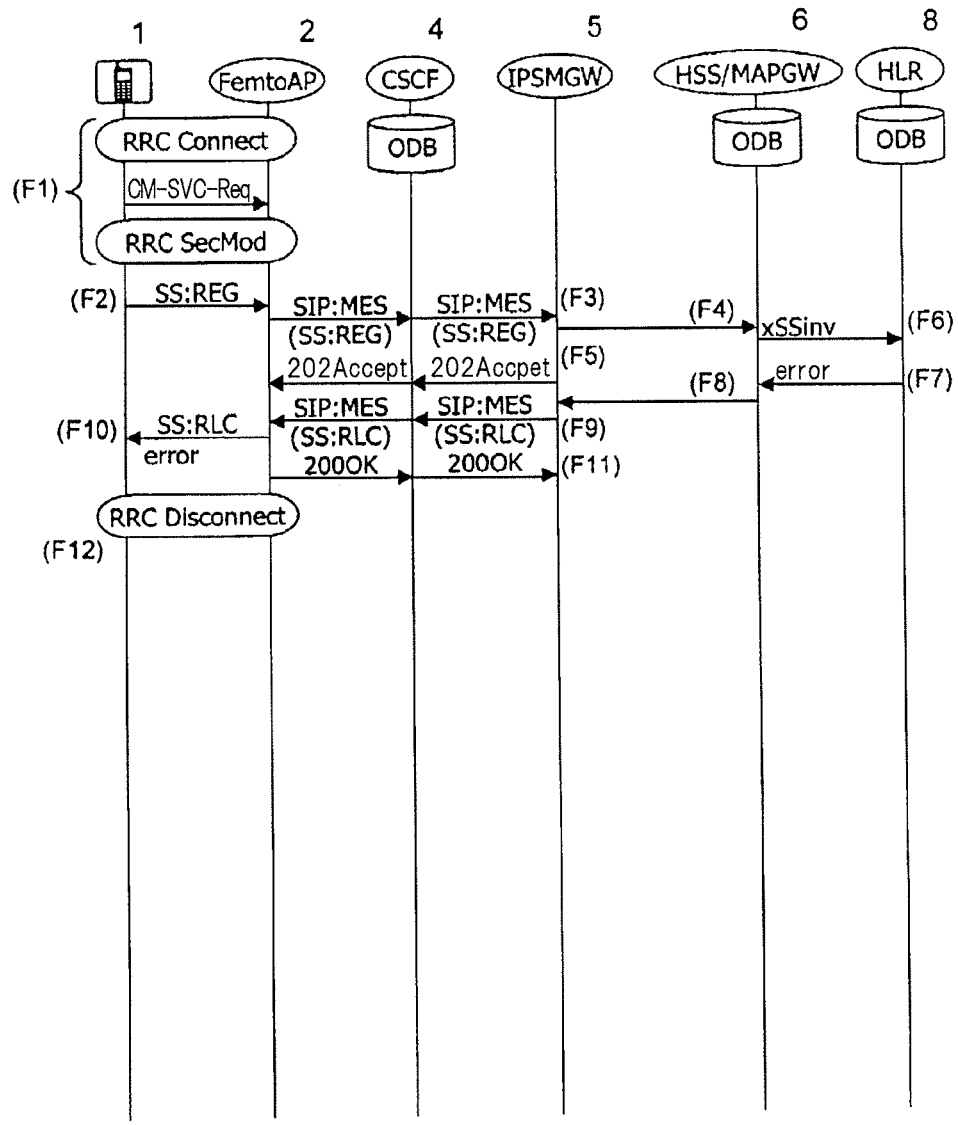
FIG. 10 is a sequence diagram illustrating an operation example in the case of Type #3 in FIG. 4 where ODB is set.

Next, the operation in the case of Type #3 in FIG. 4, that is, the case where a supplementary service request such as CF and/or CW setting, setting cancellation, pause or pause cancellation is transmitted from UE 1 and a transmission regulation by ODB is set will be described with reference to a sequence diagram in FIG. 10.

Figure 9:
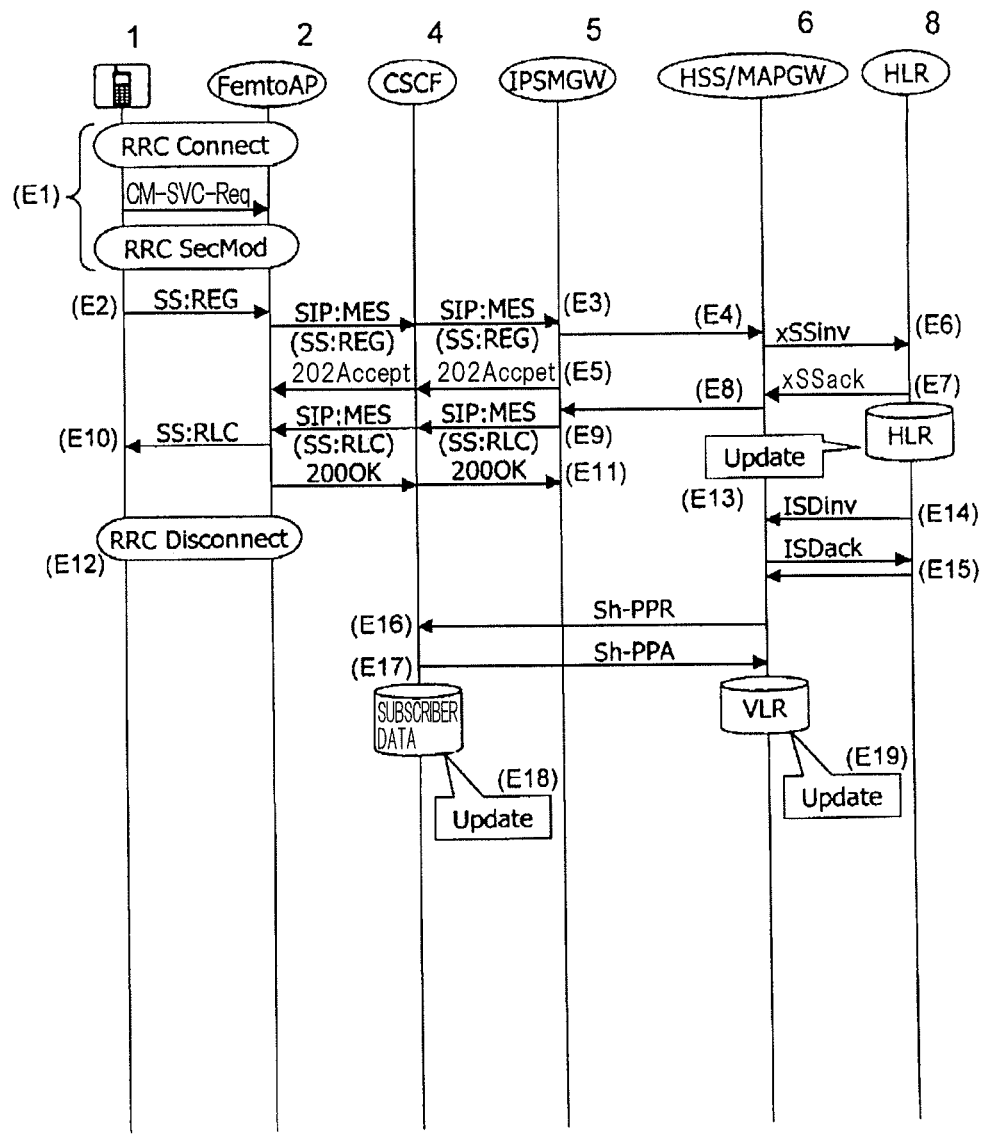
FIG. 9 is a sequence diagram illustrating an operation example in the case of Type #3 in FIG. 4.

The operation in steps F1 to F6 is similar to the operation in steps E1 to E6 in the aforementioned sequence diagram in FIG. 9.

That is, even in the case where ODB is set, the value of a CPC parameter is set to notification as described above, and therefore a CF setting request from UE 1 is transmitted to HLR 8 without being regulated by ODB in CSCF 4.

Upon receiving the CF setting request, HLR 8 refers to the user information database in the apparatus, and because ODB is set, HLR 8 transmits an error message to HSS/MAPGW 6 (step F7).

Upon receiving the error from HLR 8, HSS/MAPGW 6 maps the received content to a message of a protocol such as DIAMETER through the MAPGW function and transmits the message of such a converted protocol to IPSMGW 5 (step F8).

Upon receiving the error from HSS/MAPGW 6, IPSMGW 5 maps the received content into the SIP message by setting Message Type to Release Comp and Protocol Discriminator to SS, as described above, converts the received contents to a SIP message and transmits the SIP message to Femto AP 2 using the MESSAGE method (step F9).

Upon receiving the error from IPSMGW 5, Femto AP 2 maps the received contents to a signal whose Message Type is Release Comp and whose Protocol Discriminator is SS as opposed to the aforementioned mapping in FIG. 2 and transmits the error to UE 1 through such a converted signal (step F10).

Furthermore, Femto AP 2 sends a SIP message of 200 OK back to IPSMGW 5 (step F11).

When the error is transmitted to UE 1 in this way, UE 1 cancels the communication connection with Femto AP 2 (step F12) and also notifies the user through screen display or the like that CF setting disabled.

Next, the operation in the case of Type #4 in FIG. 4, that is, the case where a supplementary service request such, as a setting content referencing request of CFU (call forwarding unconditional) in CF setting, a setting content referencing request of CB call arrival regulation is transmitted from UE 1 will be described with reference to a sequence diagram in FIG. 11.

The operation example of Type #4 in FIG. 4 is an operation example which does not go so far as to require the user to enter a password to make a referencing request, but requires access to HLR 8. In the following operation example, a case where a CFU setting content referencing request is inputted from the user will be described.

When connected to Femto AP 2 through radio communication (step G1), UE 1 transmits a CFU setting contents referencing request to Femto AP 2 using a signal whose Message Type is Register and whose Protocol Discriminator is SS (step G2).

Upon receiving information indicating supplementary service control (first information), that is, CFU setting contents referencing request from UE 1, Femto AP 2 maps the received contents to the SIP message as described above and converts the received contents to a SIP message in the MESSAGE method. Femto AP 2 then transmits the converted SIP message to IPSMGW 5 (step G3).

Upon receiving the CFU setting contents referencing request through the SIP message in the MESSAGE method from Femto AP 2, because Protocol Discriminator is SS, IPSMGW 5 determines that the destination of the received content, to be transmitted as a message, is not SMSC 95 in the case of a short message but is HSS/MAPGW 6. Therefore, IPSMGW 5 maps the received contents to a message of a predetermined IP-based protocol such as DIAMETER and transmits the message of such a converted protocol to HSS/MAPGW 6 (step G4).

Furthermore, IPSMGW 5 sends a SIP message of 202 Accept back to Femto AP 2 (step G5).

Upon receiving the CFU setting contents referencing request from IPSMGW 5, HSS/MAPGW 6 transmits the received message contents (second information), that is, ISS-inv, which is a message of a method corresponding to the CFU setting contents referencing request, to HLR 8 through the MAPGW function (step G6).

Upon receiving the CFU setting contents referencing request, HLR 8 searches and reads the CFU setting contents of the user in the user information database and transmits the CFU setting contents to HSS/MAPGW 6 using a message of ISS-ack (step G7).

Upon receiving the CFU setting contents from HLR 8, HSS/MAPGW 6 maps the received contents to a message of a protocol such as DIAMETER through the MAPGW function and transmits the message of such a converted protocol to IPSMGW 5 (step G8).

Upon receiving the CFU setting contents from HSS/MAPGW 6, IPSMGW 5 maps the received contents into the SIP message by setting Message Type to Release Comp and Protocol Discriminator to SS as described above, converts the received contents to a SIP message and transmits the SIP message to Femto AP 2 using the MESSAGE method (step G9).

Upon receiving the CFU setting contents from IPSMGW 5, Femto AP 2 maps the received contents to a signal whose Message Type is Release Comp and whose Protocol Discriminator is SS as opposed to the aforementioned mapping in FIG. 2 and transmits the CFU setting contents to UE 1 using such a converted signal (step G10).

Furthermore, Femto AP 2 sends a SIP message of 200 OK back to IPSMGW 5 (step G11).

When the CFU setting contents are transmitted to UE 1 in this way, UE 1 cancels the communication connection with Femto AP 2 (step G12) and notifies the CFU setting contents to the user through the screen display or the like.

Figure 12:
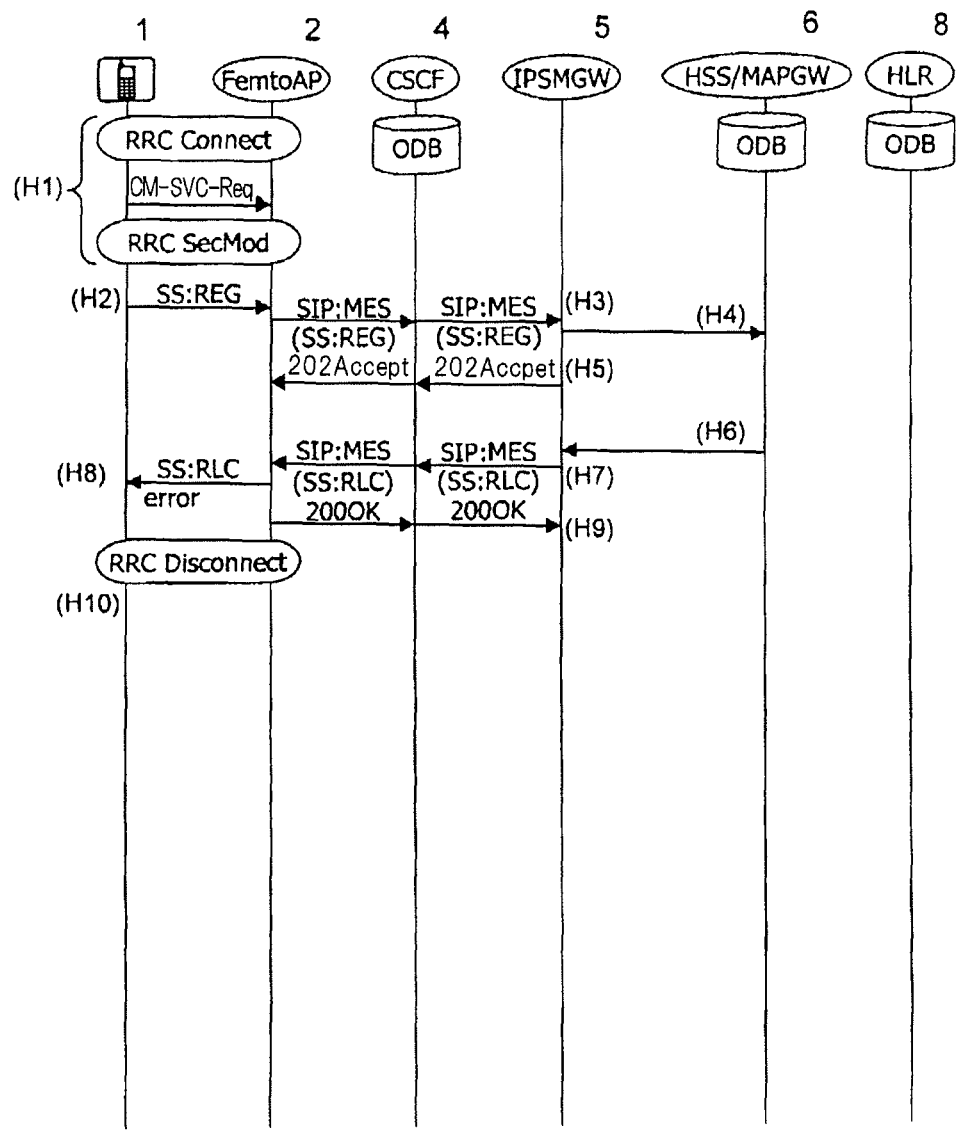
FIG. 12 is a sequence diagram illustrating an operation example in the case of Type #4 in FIG. 4 where ODB is set.

Next, the operation in the case of Type #4 in FIG. 4, that is, the case where a supplementary service request such as a setting contents referencing request of CFU (call forwarding unconditional) in CF setting or setting contents referencing request on a CB call arrival regulation is transmitted from UE 1 and a transmission regulation by ODB is set will be described with reference to a sequence diagram in FIG. 12.

Figure 11:
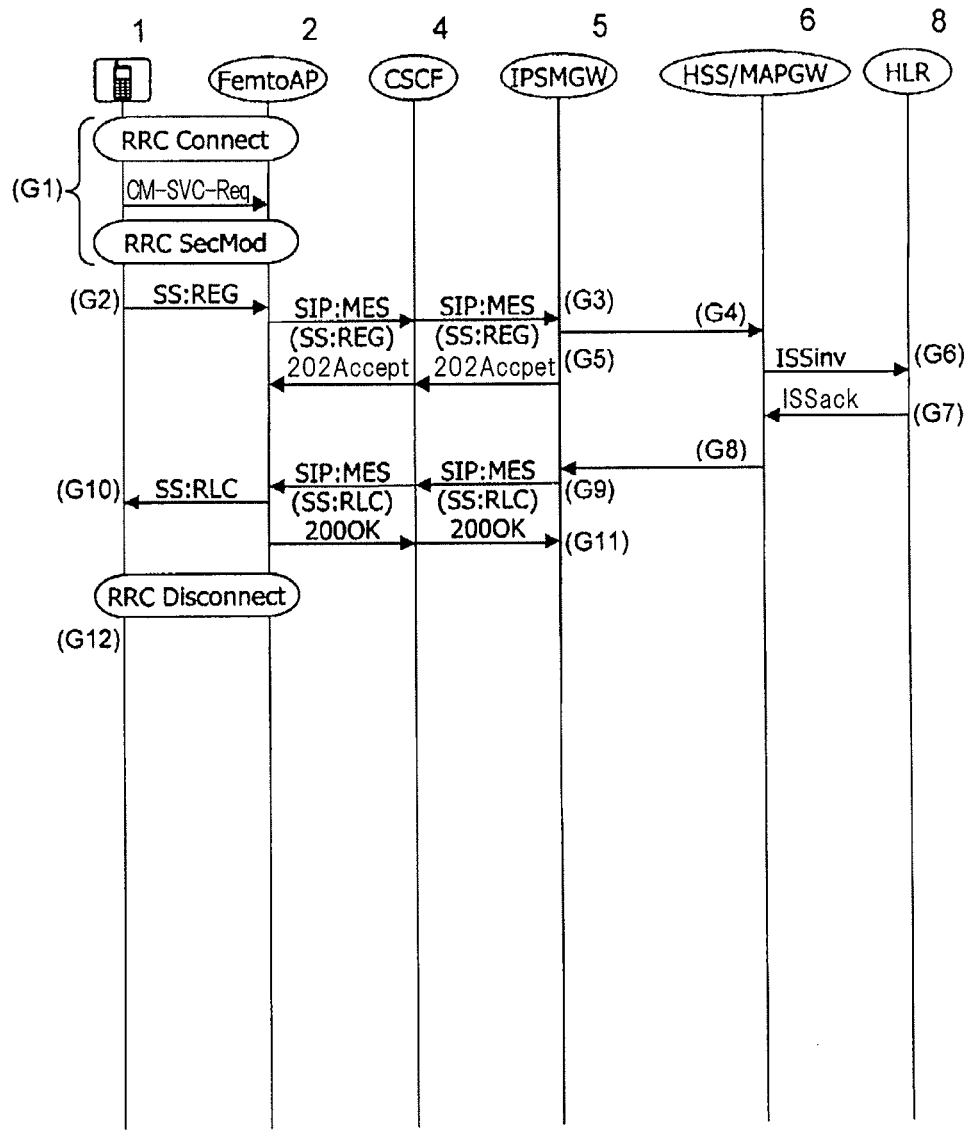
FIG. 11 is a sequence diagram illustrating an operation example in the case of Type #4 in FIG. 4.

The operation in steps H1 to H5 is similar to the operation in steps G1 to G5 in the sequence diagram in aforementioned FIG. 11.

That is, even in the case where ODB is set, since the value of a CPC parameter is set to notification as described above, the CFU setting contents referencing request from UE 1 is transmitted to HSS/MAPGW 6 without being regulated by ODB in CSCF 4.

Upon receiving the CFU setting contents referencing request, HSS/MAPGW 6 refers to VLR 7 in the apparatus, and because ODB is set for the user, HSS/MAPGW 6 maps an error message to the message of a protocol such as DIAMETER and transmits the message to IPSMGW 5 (step H6).

Upon receiving the error from HSS/MAPGW 6, IPSMGW 5 maps the received contents into the SIP message by setting Message Type to Release Comp and Protocol Discriminator to SS as described above, converts the received contents to a SIP message and transmits the SIP message to Femto AP 2 using the MESSAGE method (step H7).

Upon receiving the error from IPSMGW 5, Femto AP 2 maps the received contents to a signal whose Message Type is Release Comp and whose Protocol Discriminator is SS as opposed to the aforementioned mapping in FIG. 2 and transmits the error to UE 1 using such a converted signal (step H8).

Furthermore, Femto AP 2 sends a SIP message of 200 OK back to IPSMGW 5 (step H9).

When the error is transmitted to UE 1 in this way, UE 1 cancels the communication connection with Femto AP 2 (step H10) and also notifies the user through screen display or the like that CFU setting contents referencing disabled.

Next, the operation in the case of Type #5 in FIG. 4, that is, the case where a supplementary service request such as CFB (call forwarding busy) in CF setting, CFNRc (Call Forwarding on Mobile Subscriber Not Reachable), setting contents referencing request of CFNRy (Call Forwarding on No Reply), setting contents referencing request of CB transmission regulation, setting contents referencing request of CW, CLIP or CLIR is transmitted from UE 1, will be described with reference to a sequence diagram in FIG. 13.

The operation example of Type #5 in FIG. 4 is an operation example where the user is required neither to enter a password nor to access HLR 8 for a referencing request. In the following operation example, a case where a CW setting contents referencing request is inputted from the user will be described.

When connected to Femto AP 2 through radio communication (step I1), UE 1 transmits a CW setting contents referencing request to Femto AP 2 using a signal whose Message Type is Register and whose Protocol Discriminator is SS (step 12).

Upon receiving information indicating supplementary service control (first information), that is, the CW setting contents referencing request from UE 1, Femto AP 2 maps the received contents to the SIP message as described above, converts the received contents to a SIP message in the MESSAGE method. Femto AP 2 then transmits the converted SIP message to IPSMGW 5 (step 13).

Upon receiving the CW setting contents referencing request through the SIP message in the MESSAGE method from Femto AP 2, because Protocol Discriminator is SS, IPSMGW 5 determines that the destination of the received contents to be transmitted as a message is not SMSC 95 in the case of a short message but is HSS/MAPGW 6. Thus, IPSMGW 5 maps the received contents to a message of a predetermined IP-based protocol such as DIAMETER and transmits the message of such a converted protocol to HSS/MAPGW 6 (step 14).

Furthermore, IPSMGW 5 sends a SIP message of 202 Accept back to Femto AP 2 (step 1S).

Upon receiving the CW setting contents referencing request from IPSMGW 5, HSS/MAPGW 6 searches VLR 7 in the apparatus, reads the CW setting contents of the user, maps a message of a protocol such as DIAMETER through the MAPGW function and transmits the message to IPSMGW 5 (step 16).

Upon receiving the CW setting contents from HSS/MAPGW 6, IPSMGW 5 maps the received contents into the SIP message by setting Message Type to Release Comp and Protocol Discriminator to SS as described above, converts the received contents to a SIP message and transmits the SIP message to Femto AP 2 using the MESSAGE method (step 17).

Upon receiving the CW setting contents from IPSMGW 5, Femto AP 2 maps the received contents to a signal whose Message Type is Release Comp and whose Protocol Discriminator is SS as opposed to the aforementioned mapping in FIG. 2 and transmits the CW setting contents to UE 1 using such a converted signal (step 18).

Furthermore, Femto AP 2 sends a SIP message of 200 OK back to IPSMGW 5 (step 19).

When the CW setting contents are transmitted to UE 1 in this way, UE 1 cancels the communication connection with Femto AP 2 (step I10) and also notifies the CW setting contents to the user through screen display or the like.

Figure 14:
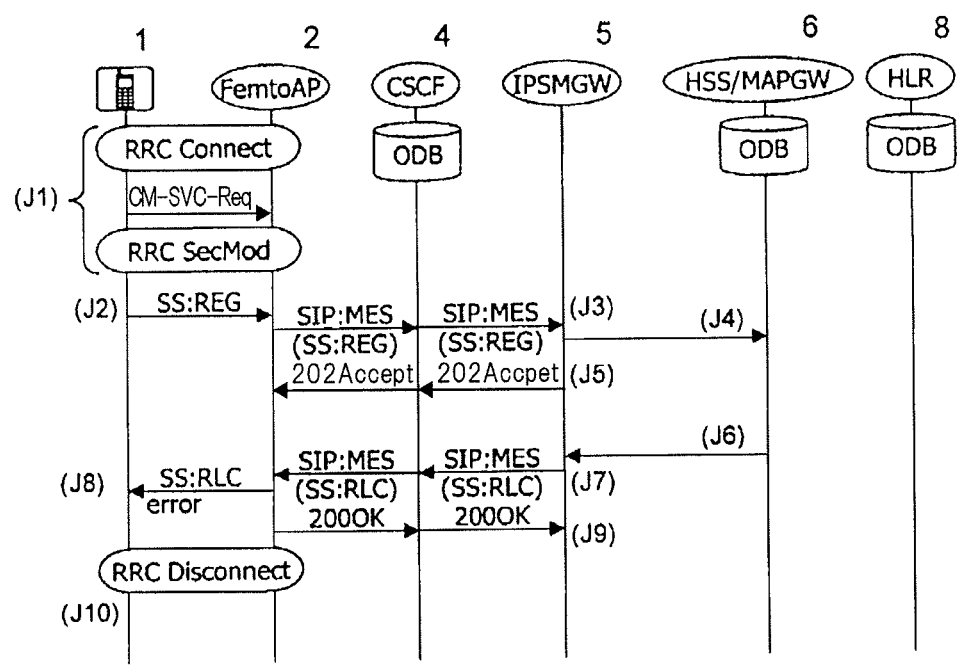
FIG. 14 is a sequence diagram illustrating an operation example in the case of Type #5 in FIG. 4 where ODB is set.

Next, the operation in the case of Type #5 in FIG. 4, that is, the case where a supplementary service request such as CFB (call forwarding busy) in CF setting, setting contents referencing request of CFNRc (Call Forwarding on Mobile Subscriber Not Reachable) and CFNRy (Call Forwarding on No Reply), setting contents referencing request of CB transmission regulation or setting contents referencing request of CW, CLIP or CLIR is transmitted from UE 1 and a transmission regulation by ODB is set will be described with reference to a sequence diagram in FIG. 14.

Figure 13:
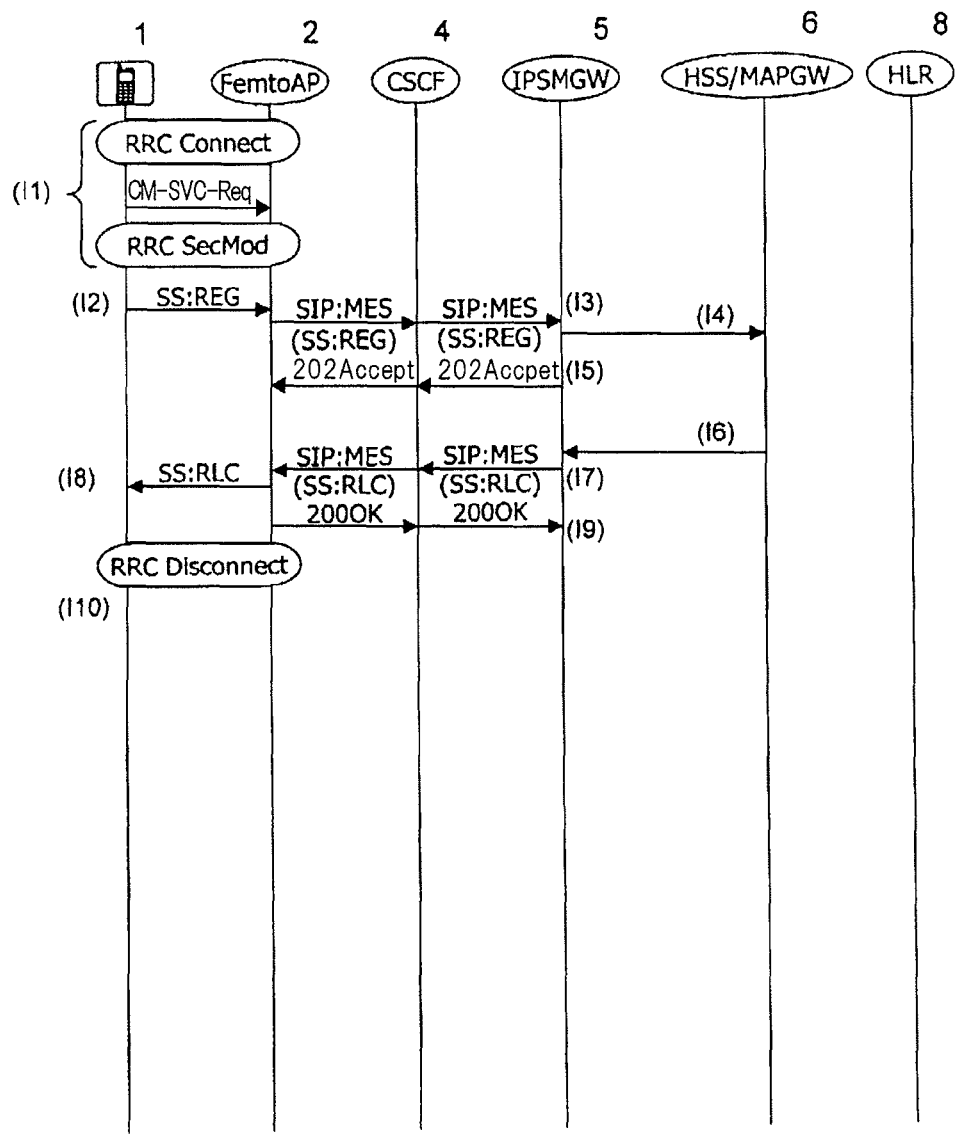
FIG. 13 is a sequence diagram illustrating an operation example in the case of Type #5 in FIG. 4.

The operation in steps J1 to J5 is similar to the operation in steps I1 to I5 in the aforementioned sequence diagram in FIG. 13.

That is, even when ODB is set, the value of a CPC parameter is set to notification as described above, and therefore a CW setting contents referencing request from UE 1 is transmitted to HSS/MAPGW 6 without being regulated by ODB in CSCF 4.

Upon receiving the CW setting contents referencing request, HSS/MAPGW 6 refers to VLR 7 in the apparatus, and because ODB is set for the user, HSS/MAPGW 6 maps an error message to a message of a protocol such as DIAMETER and transmits the error message to IPSMGW 5 (step J6).

Upon receiving the error from HSS/MAPGW 6, IPSMGW 5 maps the received contents into the SIP message by setting Message Type to Release Comp and Protocol Discriminator to SS as described above, converts the received contents to a SIP message and transmits the SIP message to Femto AP 2 using the MESSAGE method (step J7).

Upon receiving the error from IPSMGW 5, Femto AP 2 maps the received contents to a signal whose Message Type is Release Comp and whose Protocol Discriminator is SS as opposed to the aforementioned mapping in FIG. 2 and transmits the error to UE 1 using such a converted signal (step J8).

Furthermore, Femto AP 2 sends a SIP message of 200 OK back to IPSMGW 5 (step J9).

When the error is transmitted to UE 1 in this way, UE 1 cancels the communication connection with Femto AP 2 (step J10) and also notifies the user through screen display or the like that the CW setting contents referencing disabled.

As described above, according to the aforementioned exemplary embodiment, even when UE 1 is accommodated in Femto AP 2, the core network can recognize information on supplementary service control from UE 1. Thus, supplementary service control similar to that in a case where UE 1 is accommodated in Node-B 91 of a macro network can be provided.

Thus, according to the present exemplary embodiment, a supplementary service similar to that in the existing 3G network can be realized in a Femto IMS network provided with Femto AP 2.

Furthermore, the present exemplary embodiment sets the value of a CPC parameter to notification in a SIP message converted by Femto AP 2 so as to include supplementary service identification information from UE 1, and can thereby transmit supplementary service identification information from UE 1 to IPSMGW 5 through CSCF without generating any problem with a transmission regulation.

Furthermore, the present exemplary embodiment uses a MESSAGE method in a SIP message converted by Femto AP 2 so as to include supplementary service identification information from UE 1, and can thereby allow IPSMGW 5 to recognize a control signal for SS control and smoothly distribute control information for SS control through the core network.

The aforementioned exemplary embodiment is an embodiment and the present invention is not limited to the exemplary embodiment but can be implemented modified in various ways based on the technical idea of the present invention.

For example, the aforementioned exemplary embodiment assumes that the value of Protocol Discriminator in a SIP message indicates SS control and uses the value of Protocol Discriminator for determination in IPSMGW 5 or the like as supplementary service identification information indicating SS control, but this supplementary service identification information is not limited to Protocol Discriminator as long as it is information indicating SS control and may be other information in the SIP message. That is, even when this supplementary service identification information is, for example, header information of a SIP message or a configuration included in other parts of the Body section of the SIP message, the present invention can likewise be implemented if the SIP message includes information identifiable as information indicating SS control.

The "system" in the present specification refers to a logical set of a plurality of apparatuses (or function modules that realize specific functions) and it does not particularly matter whether or not each apparatus or each function module is located in a single enclosure.

IPSMGW 5, HSS/MAPGW 6, VLR 7 and HLR 8 in particular are intended to realize predetermined functions and it does not particularly matter whether or not the configuration to realize each function is located in a single enclosure.

Furthermore, the aforementioned exemplary embodiment describes that IPSMGW 5 determines the destination, based on whether a received SIP message indicates SMS or another control signal such as SS control, converts, if the received SIP message indicates a control signal, its protocol and transmits/receives a signal to/from HSS/MAPGW 6. However, the present invention is not limited to the above described configuration as long as functions of the present exemplary embodiment such as determination, conversion, transmission/reception can be realized, and the present invention can be likewise implemented with a configuration in which other apparatuses are provided with those functions.

Figure 15:
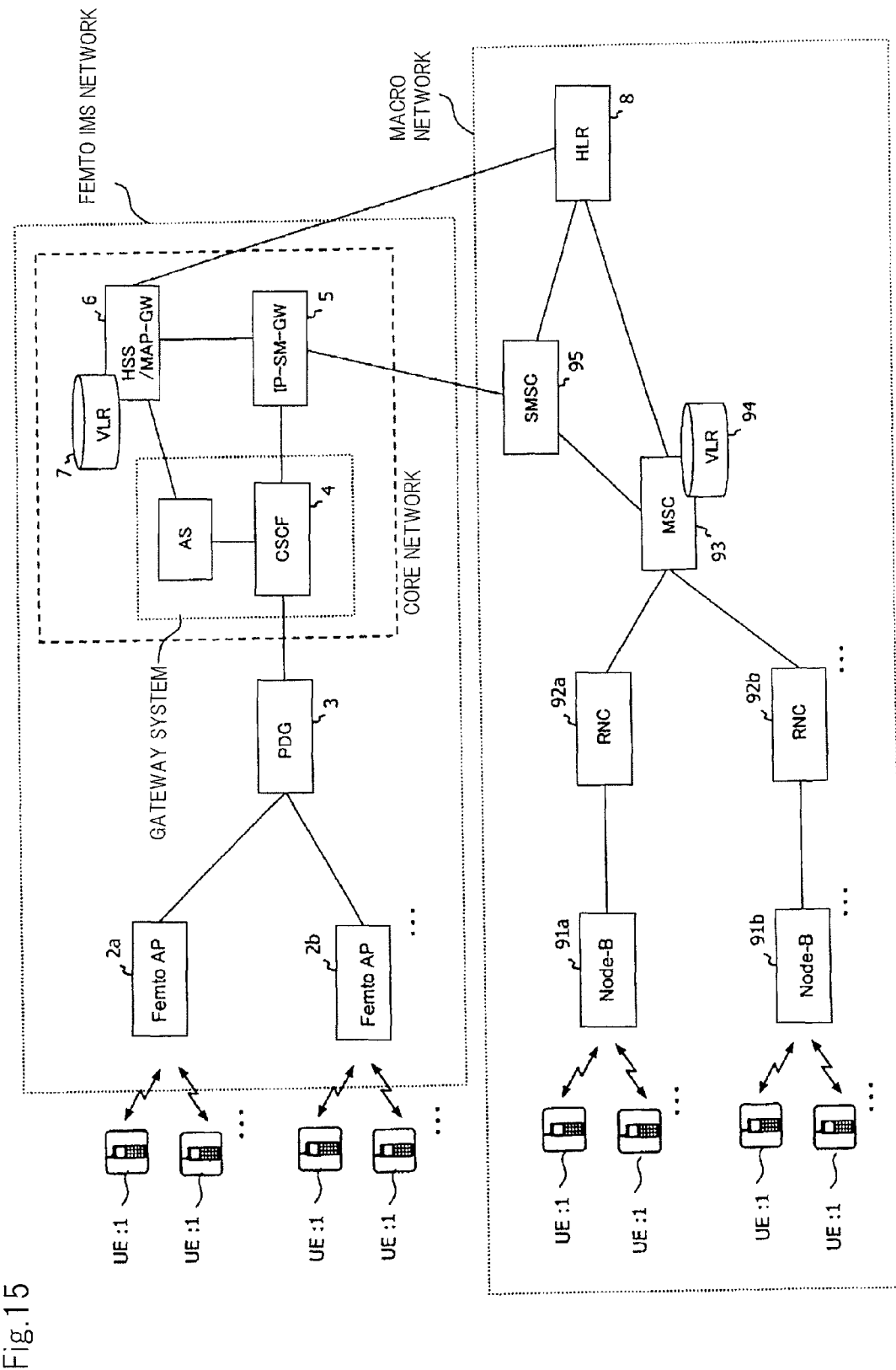
FIG. 15 is a block diagram illustrating another configuration example of the communication system of the present exemplary embodiment.

For example, as shown in FIG. 15, the present invention may have a configuration in which a service dividing function provided for CSCF 4 as standard performs the aforementioned determination on the destination and an AS (application server; conversion apparatus) performs control over communication with HSS/MAPGW 6 such as protocol conversion and transmission/reception. That is, the present invention can likewise be implemented with a configuration in which the gateway system made up of CSCF 4 and AS is mounted with functions of the present exemplary embodiment such as determination, conversion and transmission/reception using aforementioned IPSMGW 5.

In the case of the configuration shown in FIG. 15, Femto AP 2 adds some service discriminant to a SIP message to be transmitted and CSCF 4 thereby refers to iFC (Initial Filter Criteria) of a subscriber profile downloaded from HSS/MAPGW 6 and determines the destination.

Furthermore, in the aforementioned configuration shown in FIG. 15, the AS has been described as being provided with a communication control function with HSS/MAPGW 6 such as protocol conversion and transmission/reception, but it does not particularly matter where the conversion apparatus that realizes this communication control function is located as described above and, for example, CSCF 4 or HSS may have the conversion apparatus.

Furthermore, by recording a processing procedure for realizing the femto cell base station, IPSMGW (short message gateway apparatus), HSS/MAPGW (MAP gateway apparatus) of the aforementioned exemplary embodiment as a program in a recording medium, it is possible to realize the above described functions according to the exemplary embodiment by causing a CPU of a computer making up the system to execute the processing using the program supplied from the recording medium.

In this case, the present invention is also applicable to a case where an information group, including the program, is supplied to an output apparatus from the above described recording medium or from an external recording medium via a network.

That is, the program code read from the recording medium itself realizes a new function of the present invention and the recording medium that stores the program code and signals read from the recording medium constitute the present invention.

For example, a flexible disk, hard disk, optical disk, magneto-optical disk, CD-ROM, CD-R, CD-RW, DVD-ROM, DVD-RAM, DVD-RW, DVD+RW, magnetic tape, non-volatile memory card and ROM may be used as this recording medium.

The program according to the present invention can cause the femto cell base station, short message gateway apparatus and MAP gateway apparatus controlled by the program to realize the respective functions in the aforementioned exemplary embodiment.

Hereinafter, a basic configuration of apparatuses included in the communication system of the present exemplary embodiment will be described.

Figure 16:
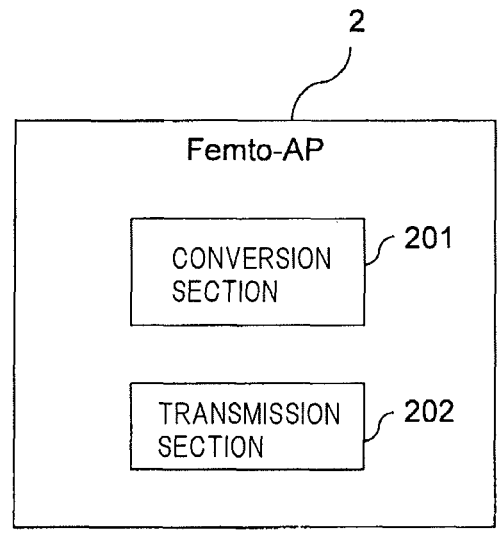
FIG. 16 is a block diagram illustrating a basic configuration of a femto cell base station (Femto AP 2).

FIG. 16 is a block diagram illustrating a basic configuration of the femto cell base station (Femto AP 2). According to FIG. 16, the femto cell base station (Femto AP 2) is provided with conversion section 201 and transmission section 202.

Upon receiving first information indicating supplementary service control from a radio terminal (UE 1), conversion section 201 converts the received information to a SIP message including the first information. Transmission section 202 transmits the SIP message converted by conversion section 201 to a higher apparatus (IPSMGW 5) in the communication system.

Figure 17:
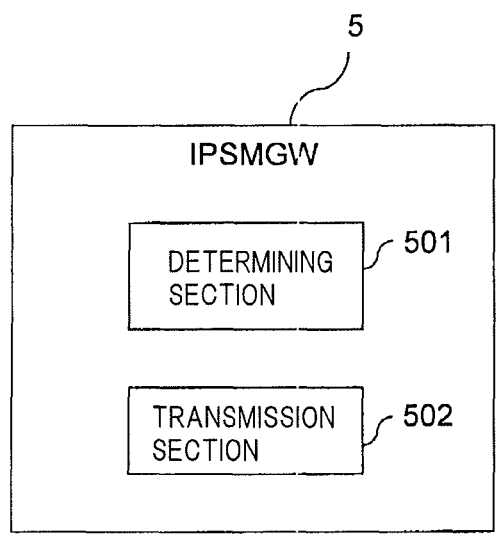
FIG. 17 is a block diagram illustrating a basic configuration of a gateway system (IPSMGW 5).

FIG. 17 is a block diagram illustrating a basic configuration of a gateway system (IPSMGW 5). According to FIG. 17, the gateway system (IPSMGW 5) is provided with determining section 501 and transmission section 502.

Upon receiving a SIP message, determining section 501 determines whether the message is to be transmitted to the core apparatus (HSS/MAPGW 6) included in the core network of the communication system or transmitted to an apparatus not included in the core network. Transmission section 502 transmits contents of the SIP message determined by determining section 501, that are to be transmitted to the core apparatus, to the core apparatus. The gateway system shown in FIG. 17 may also be constructed of a system having CSCF 4 and AS shown in FIG. 15.

Figure 18:
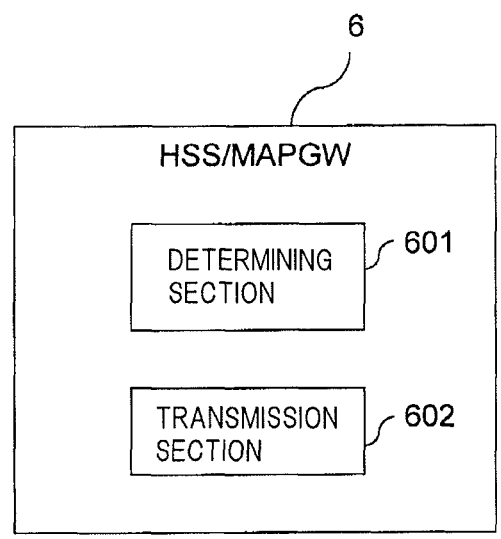
FIG. 18 is a block diagram illustrating a basic configuration of a MAP gateway apparatus (HSS/MAPGW 6).

FIG. 18 is a block diagram illustrating a basic configuration of a MAP gateway apparatus (HSS/MAPGW 6). According to FIG. 18, the MAP gateway (HSS/MAPGW 6) is provided with determining section 601 and transmission section 602.

Determining section 601 determines whether or not a received message includes second information indicating supplementary service control. Transmission section 602 transmits, when determining section 601 determines that the second information is included, a message corresponding to the second information to HLR (Home Location Register) 8.

The present invention has been described with reference to the exemplary embodiment, but the present invention is not limited to the exemplary embodiment. Configurations and details defined in the claims can be modified in various ways understandable to those skilled in the art within the scope of the invention.

The present application claims a priority based on Japanese Patent Application No. 2009-157836, filed on Jul. 2, 2009, the disclosure of which is incorporated herein by reference in its entirety.

The invention claimed is:

1. A gateway system making up a communication system provided with a function of providing a predetermined supplementary service, comprising:
   first determining means for determining, upon receiving a SIP (Session Initiation Protocol) message, whether the message is to be transmitted to a core apparatus included in a core network of the communication system or to be transmitted to an apparatus not included in the core network; and
   transmitting means for transmitting contents of the SIP message, determined by the first determining means to be transmitted to the core apparatus, to the core apparatus,
   wherein based on whether a BODY section of a received SIP message includes the first information indicating supplementary service control or information indicating an SMS (Short Message Service), the first determining means determines that the SIP message is to be transmitted to the core apparatus when the first information is included and determines that the SIP message is to be transmitted to an apparatus not included in the core network when the information indicating the SMS is included.

2. The gateway system according to claim 1, further comprising converting means for including contents of the SIP message determined by the first determining means to be transmitted to the core apparatus and converting the contents of the SIP message to a message of a protocol to be transmitted to the core apparatus,
    wherein the transmitting means transmits the message of the protocol converted by the converting means to the core apparatus.

3. A communication control method in a communication system provided with a function of providing a predetermined supplementary service, performing:
    first determining processing of determining, when a gateway system making up the communication system receives a message by a SIP (Session Initiation Protocol), whether the message is to be transmitted to a core apparatus included in a core network of the communication system or to be transmitted to an apparatus not included in the core network; and
    transmission processing by the gateway system of transmitting contents of the SIP message, determined by the first determining processing to be transmitted to the core apparatus, to the core apparatus,
    wherein based on whether a BODY section of a SIP message received by the gateway system includes first information indicating supplementary service control or information indicating an SMS (Short Message Service), the first determining processing determines that the SIP message is to be transmitted to the core apparatus when the first information is included and determines that the SIP message is to be transmitted to an apparatus not included in the core network when the information indicating the SMS is included.

4. The communication control method according to claim 3, wherein the gateway system performs conversion processing of including contents of a SIP message, determined through the first determining processing to be transmitted to the core apparatus, and converting the message to a message of a protocol to be transmitted to the core apparatus, and
    the transmission processing transmits the message of the protocol converted through the conversion processing to the core apparatus.

5. A non-transitory computer readable medium for storing a program of a short message gateway apparatus in a communication system provided with a function of providing a predetermined supplementary service, causing a computer of the short message gateway apparatus to execute:
    first determining processing of determining, upon receiving a message by a SIP (Session Initiation Protocol), whether the message is to be transmitted to a core apparatus included in a core network of the communication system or to be transmitted to an apparatus not included in the core network; and
    transmission processing of transmitting contents of the SIP message, determined by the first determining processing to be transmitted to the core apparatus, to the core apparatus,
    wherein based on whether a BODY section of a SIP message received by the gateway system includes first information indicating supplementary service control or information indicating an SMS (Short Message Service), the first determining processing determines that the SIP message is to be transmitted to the core apparatus when the first information is included and determines that the SIP message is to be transmitted to an apparatus not included in the core network when the information indicating the SMS is included.

* * * * *